US012518545B2

(12) United States Patent
Narushima

(10) Patent No.: US 12,518,545 B2
(45) Date of Patent: Jan. 6, 2026

(54) INFORMATION PROCESSING DEVICE, MOBILE TERMINAL, USER TERMINAL AND INFORMATION PROCESSING METHOD

(71) Applicant: MICWARE CO., LTD., Kobe (JP)

(72) Inventor: Kenji Narushima, Kobe (JP)

(73) Assignee: MICWARE CO., LTD., Kobe (JP)

( * ) Notice: Subject to any disclaimer, the term of this patent is extended or adjusted under 35 U.S.C. 154(b) by 0 days.

(21) Appl. No.: 19/188,000

(22) Filed: Apr. 24, 2025

(65) Prior Publication Data

US 2025/0252753 A1  Aug. 7, 2025

Related U.S. Application Data

(63) Continuation of application No. PCT/JP2022/047551, filed on Dec. 23, 2022.

(51) Int. Cl.
*G06V 20/56* (2022.01)
*G06T 7/20* (2017.01)

(52) U.S. Cl.
CPC .............. *G06V 20/56* (2022.01); *G06T 7/20* (2013.01); *G06T 2207/30241* (2013.01)

(58) Field of Classification Search
CPC ..... H04W 4/029; H04W 64/00; H04W 4/027; H04W 4/90; H04W 64/006; H04W 4/185;
(Continued)

(56) References Cited

U.S. PATENT DOCUMENTS

2004/0249565 A1* 12/2004 Park ...................... G01C 21/36
701/410
2006/0152592 A1 7/2006 Chishima et al.
(Continued)

FOREIGN PATENT DOCUMENTS

JP  2006-186645 A  7/2006
JP  2018-37886 A  3/2018
(Continued)

OTHER PUBLICATIONS

Japanese Notice of Reasons for Refusal dated Mar. 11, 2025.
Japanese decision to grant a patent dated Apr. 1, 2025.

*Primary Examiner* — Masum Billah
(74) *Attorney, Agent, or Firm* — Yokoi & Co., U.S.A.; Toshiyuki Yokoi

(57) ABSTRACT

An information processing device including: an inquiry receiver configured to receive an inquiry including a route identification information for identifying a route from a user terminal; a video obtainer configured to obtain a video captured by each of one or a plurality of mobile terminals satisfying a route condition which is a condition corresponding to at least a part of the route identified by the route identification information; and a video transmitter configure to transmit the video to the user terminal, wherein the video obtainer obtains a first video corresponding to a first positional information for identifying a first partial route in the route identified by the route identification information and obtain a second video corresponding to a second positional information for identifying a second partial route which is beyond the first partial route in the route, and the video transmitter transmits the first and second videos.

6 Claims, 21 Drawing Sheets

(58) Field of Classification Search
CPC ....... H04W 4/80; H04W 4/02; H04W 72/046;
G06T 19/006; G06T 7/11; G06T 7/00;
G06T 11/60; G06T 2207/20084; G06T
7/70; G06T 7/0012; G06T 19/003; G06T
2207/10016
USPC ........................................................ 348/148
See application file for complete search history.

(56) References Cited

U.S. PATENT DOCUMENTS

| | | |
|---|---|---|
| 2018/0063539 A1 | 3/2018 | Ueno et al. |
| 2018/0124476 A1 | 5/2018 | Nakagawa et al. |
| 2018/0321046 A1* | 11/2018 | Titze ................. G01C 21/3837 |
| 2020/0191598 A1 | 6/2020 | Kusama et al. |
| 2021/0158632 A1* | 5/2021 | Nishiyama ........... G08G 1/0133 |
| 2023/0066144 A1 | 3/2023 | Yoshikawa et al. |

FOREIGN PATENT DOCUMENTS

| | | |
|---|---|---|
| JP | 2018-74412 A | 5/2018 |
| JP | 2020-94958 A | 6/2020 |
| JP | 2021-83034 A | 5/2021 |
| WO | 2021/225085 A | 11/2021 |

\* cited by examiner

Fig. 12

| ID | terminal identifier | terminal communication information | attribute value set | | |
|---|---|---|---|---|---|
| | | | time | positional information | ... |
| 1 | T001 | destination 1 | $T_{11}$ | $(x_{11}, y_{11})$ | ... |
| | | | $T_{12}$ | $(x_{12}, y_{12})$ | ... |
| | | | $\vdots$ | $\vdots$ | $\vdots$ |
| | | | $T_{1n}$ | $(x_{1n}, y_{1n})$ | ... |
| 2 | T002 | destination 2 | $T_{21}$ | $(x_{21}, y_{21})$ | ... |
| | | | $\vdots$ | $\vdots$ | $\vdots$ |
| | | | $T_{2m}$ | $(x_{2m}, y_{2m})$ | ... |
| 3 | T003 | destination 3 | $T_{31}$ | $(x_{31}, y_{31})$ | ... |
| | | | $\vdots$ | $\vdots$ | $\vdots$ |
| | | | $T_{3x}$ | $(x_{3x}, y_{3x})$ | ... |
| $\vdots$ | $\vdots$ | $\vdots$ | $\vdots$ | $\vdots$ | $\vdots$ |

INFORMATION PROCESSING DEVICE, MOBILE TERMINAL, USER TERMINAL AND INFORMATION PROCESSING METHOD

CROSS-REFERENCE TO RELATED APPLICATIONS

This Application claims the benefit of priority and is a Continuation application of the prior International Patent Application No. PCT/JP2022/047551, with an international filing date of Dec. 23, 2022, which designated the United States, the entire disclosures of all applications are expressly incorporated by reference in their entirety herein.

TECHNICAL FIELD

The present invention relates to an information processing device or the like which can be a platform for providing a video on a route.

BACKGROUND OF THE INVENTION

Conventionally, a technology for providing image data of on-vehicle camera captured at a position and an environment desired by a user is available (e.g., shown in Patent Document 1).

PRIOR ART

Patent Documents

[Patent Document 1] Japanese Patent Publication No. 2021-83034

SUMMARY OF THE INVENTION

Problem to be Solved by the Invention

However, in the conventional technology, it is impossible to appropriately obtain the video captured by a mobile terminal at the position on the route.

Means for Solving the Problems

An information processing device of the first aspect of the present invention includes: an inquiry receiver configured to receive an inquiry including a route identification information for identifying a route from a user terminal; a video obtainer configured to obtain a first video corresponding to a first positional information for identifying a first partial route in a video corresponding a positional information for identifying at least a part of the route identified by the route identification information and obtain a second video corresponding to a second positional information for identifying a second partial route which is beyond the first partial route in the route identified by the route identification information; and a video transmitter configured to transmit the first video and the second video to the user terminal.

The above described configuration can be a platform for appropriately providing the video captured at the position on the route by each of a plurality of mobile terminals.

An information processing device of the second aspect of the present invention is the information processing device according to the first aspect, further including: a terminal manager configured to store a terminal information including a terminal positional information for identifying a position of each of one or more mobile terminals while being associated with each of the one or more mobile terminals; a position receiver configured to receive the terminal positional information from each of the one or more mobile terminals; and a terminal determination unit configured to determine the one or more mobile terminals located in at least a part of the route identified by the route identification information using the terminal positional information received by the position receiver, wherein the video obtainer is configured to obtain the video captured by each of the one or more mobile terminals determined by the terminal determination unit.

The above described configuration can provide a platform with less burden to the mobile terminals providing the video at the position on the route.

An information processing device of the third aspect of the present invention is the information processing device according to the first aspect, further including: an inquiry transmitter configured to transmit the inquiry to each of the one or more mobile terminals, wherein the video obtainer is configured to receive the video from the one or more mobile terminals determined to satisfy a route condition which is a condition corresponding to the positional information identifying at least a part of the route identified by the route identification information when the inquiry is transmitted.

The above described configuration allows to reduce the burden to the platform for appropriately providing the video captured at the position on the route by the mobile terminals.

An information processing device of the fourth aspect of the present invention is the information processing device according to any one of the first to third aspects, wherein the video obtained by the video obtainer is associated with a right holder identifier for identifying a right holder of the video, and a right holder processor is further provided to perform a right holder process which is a process related to the right holder identified by the right holder identifier associated with the video.

The above described configuration allows to perform appropriate processes related to the right holder of the video.

An information processing device of the fifth aspect of the present invention is the information processing device according to the fourth aspect, wherein the right holder processor includes a third preserver configured to accumulate the video while being associated with the right holder identifier for identifying a user of the user terminal.

The above described configuration allows to set the right holder requiring the video to the right holder of the video.

A mobile terminal of the sixth aspect of the present invention includes: a position obtainer configured to obtain a positional information for identifying a position of a mobile terminal; an image capturer configured to capture a video; a mobile receiver configured to receive an inquiry including a route identification information; a mobile determination unit configured to determine whether or not the positional information obtained by the position obtainer satisfies a route condition which is a condition corresponding to the positional information identifying at least a part of the route identified by the route identification information; and a mobile video transmitter configured to transmit the video when the mobile determination unit determines that the route condition is satisfied.

The above described configuration allows to achieve the mobile terminal capable of appropriately providing the video at the position on the route.

A user terminal of the seventh aspect of the present invention includes: a user output unit configured to output a map indicating a route; a user transmitter configured to transmit an inquiry including a route identification information for identifying the route; a user receiver configured to receive a video when the inquiry is transmitted; a user acceptor configured to accept a position instruction which is an instruction of a position on the route in the map; and a user processor configured to obtain the video corresponding to a positional information indicating the position of the position instruction, wherein the user output unit is configured to output the video obtained by the user processor.

The above described configuration allows to achieve the user terminal capable of appropriately obtaining the video at the position on the route.

Effects of the Invention

The information processing device of the present invention allows to appropriately obtain the video at the position on the route.

BRIEF DESCRIPTION OF DRAWINGS

FIG. 12 is a drawing showing a terminal management table in the first embodiment.

DETAILED DESCRIPTION OF THE INVENTION

Figure 1:
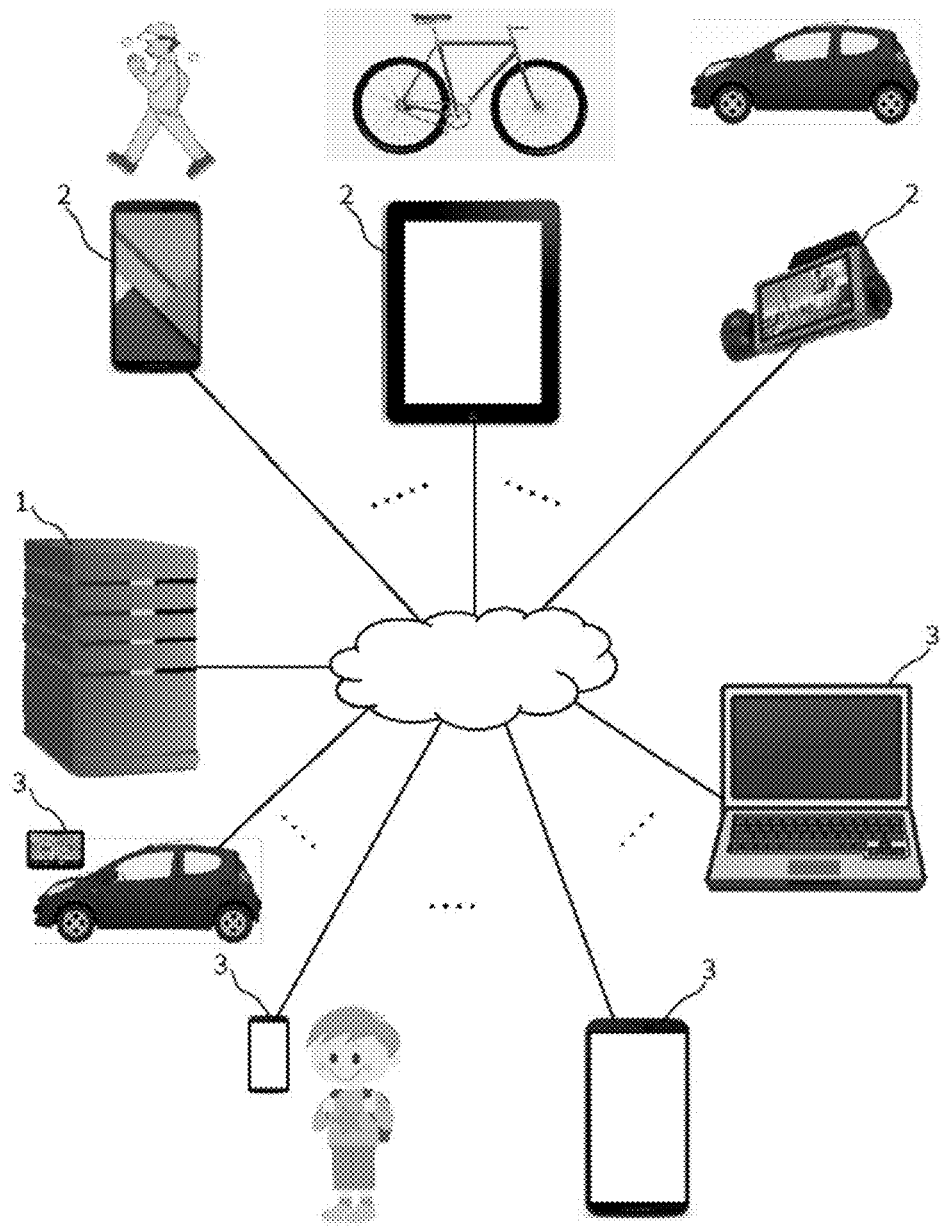
FIG. 1 is a schematic diagram of an information system A in the first embodiment.

Hereafter, embodiments of an information processing device and other configurations will be explained with reference to the drawings. The repeated explanation of the components denoted with the same reference numerals may be omitted in the embodiments since the operations are the same.

First Embodiment

Outline of First Embodiment

The present embodiment explains an information processing device which can be a platform for obtaining and providing one or a plurality of videos using a route identification information for identifying a route.

The present embodiment also explains an information processing device for performing a right holder process which is a process related to a right holder of the outputted video. The right holder process is, for example, the later-described rewarding process and later-described various preservation processes.

The present embodiment also explains a mobile terminal configured to transmit the obtained positional information to the information processing device and transmit the video captured in accordance with the transmission instruction received from the information processing device to the information processing device.

The present embodiment further explains a user terminal configured to receive an instruction of a predetermined position on the route and output the video at the predetermined position.

In the present specification, the fact that information X is associated with the information Y means that the information Y can be obtained from the information X or that the information X can be obtained from the information Y. The information X may be associated with the information Y in any manner. The information X and the information Y may be linked with each other or may be in the same buffer. The information X may be included in the information Y. The information Y may be included in the information X.

<Outline of Information System A>

FIG. 1 is a schematic diagram of an information system A in the present embodiment. The information system A includes an information processing device 1, one or a plurality of mobile terminals 2 and one or a plurality of user terminals 3.

The information processing device 1 is a server for providing the videos transmitted by each of one or a plurality of mobile terminals 2 to the user terminal 3. The information processing device 1 is a cloud server or an application service provider (ASP) server, for example. The type of the information processing device 1 is not limited. The information processing device 1 may be a device included in a blockchain.

In the present specification, the interval of the capturing time between a plurality of still images included in the video is not limited. The video includes 60 frames per second or 30 frames per second, for example. However, the video may be a set of a plurality of still images captured at an interval equal to or longer than a predetermined time (e.g., one minute) or a set of a plurality of still images captured when a predetermined condition is satisfied. The still image may also be called a field or a frame.

The mobile terminal 2 is a movable terminal. The mobile terminal 2 is installed in a movable body to capture videos. The mobile terminal 2 is, for example, a smartphone, a tablet terminal, a camera with a communication function, a glasses with a camera or a smartwatch with a camera. The installation normally means the condition where something is fastened. However, it is also possible to consider that the installation includes the situation where something is contacted or held. The movable body is an object that moves. The movable body is, for example, an underground travelling device or a living thing. The living thing is normally a human. However, the living thing may be a dog or a cat.

The user terminal 3 is a terminal used by a user. The user is a person who views the video or a person who requires the video. The user terminal 3 may have the function of the mobile terminal 2. Namely, the user terminal 3 may be the terminal of the user who provides the video. The user terminal 3 is, for example, a navigation terminal, a smartphone, a tablet terminal, a so-called personal computer, a navigation terminal or the like. The type of the user terminal is not limited.

The information processing device 1 and each of one or more mobile terminals 2 can generally communicate with each other through a network such as the Internet. The information processing device 1 and each of one or more user terminals 3 can generally communicate with each other through a network such as the Internet.

Figure 2:
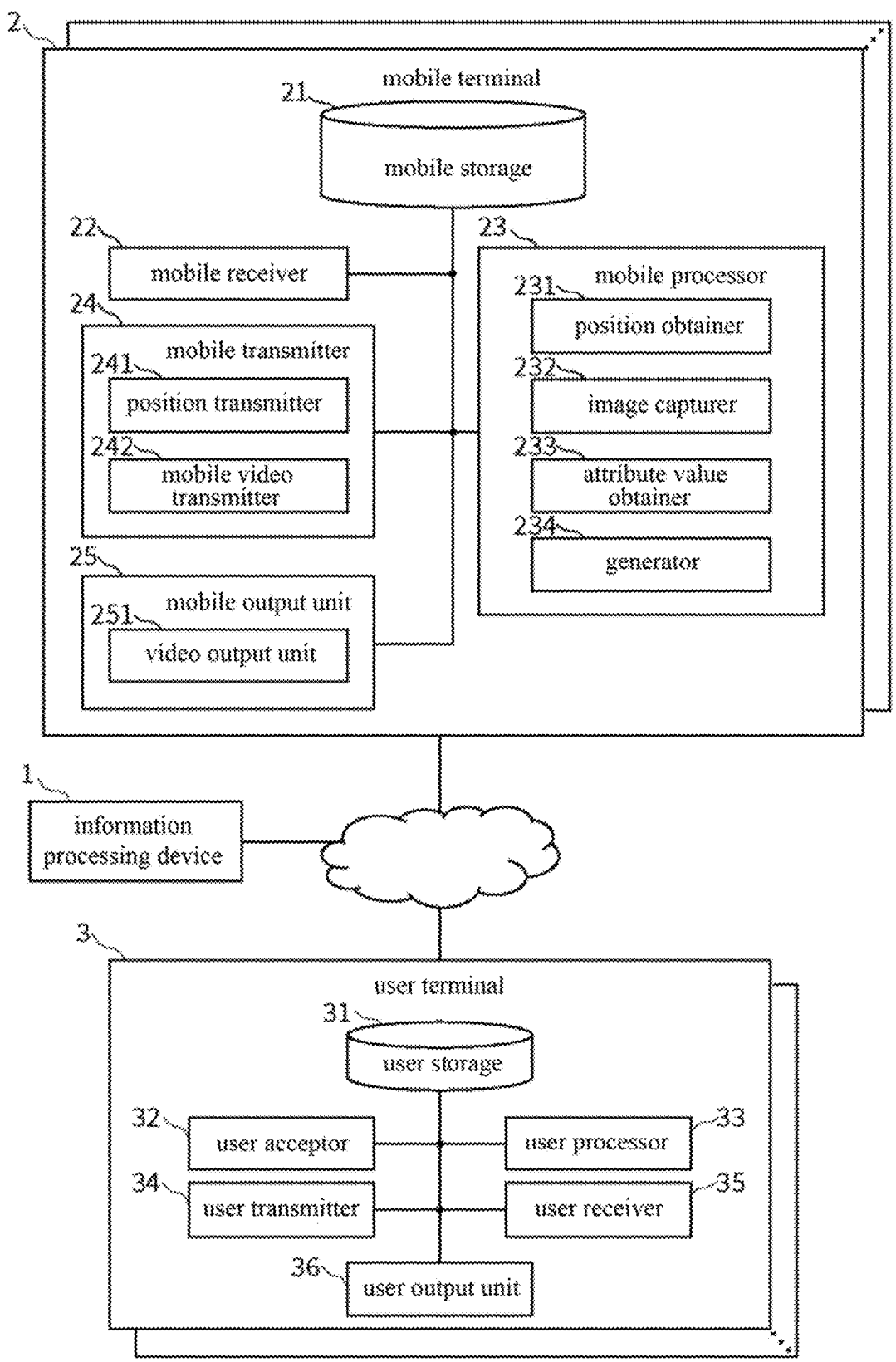
FIG. 2 is a block diagram of the information system A in the first embodiment.
Figure 3:
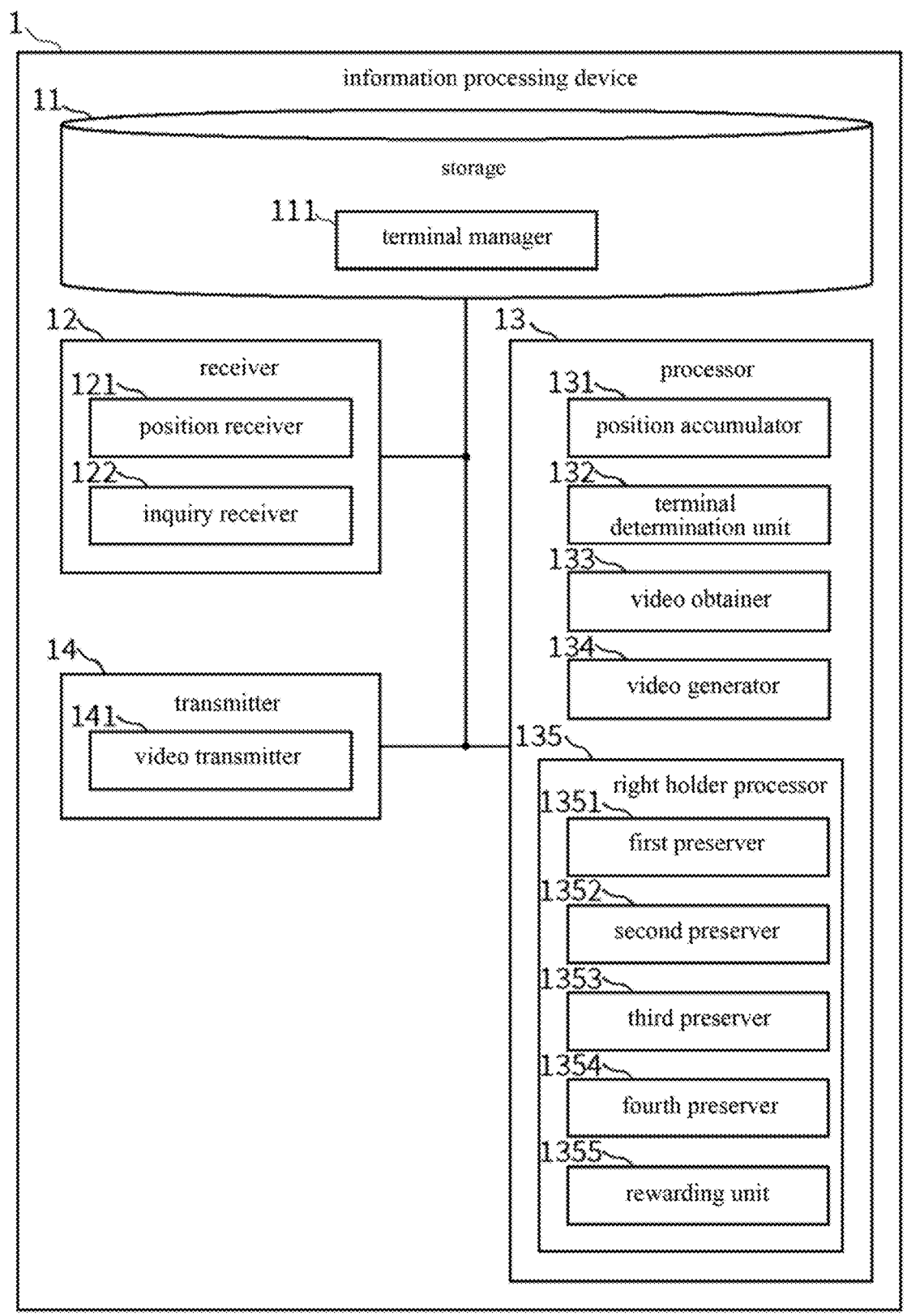
FIG. 3 is a block diagram of an information processing device 1 in the first embodiment.

FIG. 2 is a block diagram of the information system A in the present embodiment. FIG. 3 is a block diagram of the information processing device 1.

The information processing device 1 includes a storage (storage unit) 11, a receiver (reception unit) 12, a processor (processing unit) 13 and a transmitter (transmission unit) 14. The storage 11 includes a terminal manager (terminal management unit) 111. The receiver 12 includes a position receiver (position reception unit) 121 and an inquiry receiver (inquiry reception unit) 122. The processor 13 includes a position accumulator (position accumulation unit) 131, a terminal determination unit 132, a video obtainer (video obtaining unit) 133, a video generator (video generation unit) 134 and a right holder processor (right holder processing unit) 135. The right holder processor 135 includes a first preserver (first preservation unit) 1351, a second preserver (second preservation unit) 1352, a third preserver (third preservation unit) 1353, a fourth preserver (fourth preservation unit) 1354 and a rewarding unit 1355. The transmitter 14 includes a video transmitter (video transmission unit) 141.

The mobile terminal 2 includes a mobile storage (mobile storage unit) 21, a mobile receiver (mobile reception unit) 22, a mobile processor (mobile processing unit) 23, a mobile transmitter (mobile transmission unit) 24 and a mobile output unit 25. The mobile processor 23 includes a position obtainer (position obtaining unit) 231, an image capturer (image capturing unit) 232, an attribute value obtainer (attribute value obtaining unit) 233 and a generator (generation unit) 234. The mobile transmitter 24 including a position transmitter (position transmission unit) 241 and a mobile video transmitter (mobile video transmission unit) 242. The mobile output unit 25 includes a video output unit 251.

The user terminal 3 includes a user storage (user storage unit) 31, a user acceptor (user acceptance unit) 32, a user processor (user processing unit) 33, a user transmitter (user transmission unit) 34, a user receiver (user reception unit) 35 and a user output unit 36.

<Detail of Components of Information Processing Device 1>

The storage 11 stores various kinds of information. The various kinds of information are, for example, the later-described terminal information, or a video and one or a plurality of video attribute values associated with the video.

The video attribute value is an attribute value of the video. The video attribute value is, for example, an environment information. The environment information is the information about the environment where the video is captured. The environment information is, for example, the later described positional information, time information, weather information, temperature information or season information. The time information is the information for identifying the time when the video is captured. The time when the video is captured may be the time around the time when the video is captured. The accuracy is not required for the time when the video is captured. The time information is, for example, a time, a set of year, month, day and hour, a set of year, month, day, hour and minute, a set of year, month, day, hour, minute and second, a set of year, month and day or a set of month and day. Namely, the time information may indicate the time with any granularity. The weather information is the information for identifying the weather at the location (or region) where the video is captured and at the time when the video is captured. The weather information is, for example, "sunny," "rainy," "snowy" or "cloudy." The temperature information is the information for identifying a temperature at the location where the video is captured and at the time when the video is captured. The temperature information is, for example, "25 degrees" or "30 degrees or higher." The season information is the information for identifying the season at the location where the video is captured and at the time when the video is captured. The season information is, for example, "spring," "summer," "early summer" or "winter."

The terminal manager 111 stores one or a plurality of terminal information. The terminal information is the information related to the mobile terminal 2. The terminal information here normally includes a terminal identifier which is the identifier of the mobile terminal 2, the positional information and the terminal communication information. The mobile terminal 2 here is normally the terminal capable of transmitting the video. The terminal information is associated with the mobile terminal 2.

The terminal identifier is the information for identifying the mobile terminal 2. The terminal identifier may be a right holder identifier for identifying the right holder which is a user of the mobile terminal 2. The terminal identifier is, for example, an identification (ID) of the mobile terminal 2, a user identifier of the user of the mobile terminal 2, a name of the mobile terminal 2, an IP address of the mobile terminal 2 or a media access control (MAC) address of the mobile terminal 2.

The right holder is a person having any right about the video captured by the mobile terminal 2. The right holder is, for example, an owner of the video, a copyright holder of the video, an owner of the mobile terminal 2 capturing the video or an authority with disposal rights of the video. The right holder is, for example, an initial right holder of the video. Although the right holder is normally the owner of the mobile terminal 2, the right holder may be any person who has the right of the video captured by the mobile terminal 2.

The right holder identifier may be the terminal identifier. The right holder identifier is, for example, an identification (ID) of the right holder, a name of the right holder, a mail address of the right holder or a telephone number of the right holder. The ID of the right holder is, for example, a user identifier.

The positional information is the information for identifying the position. The positional information is, for example, a set of a latitude and a longitude or a set of a latitude, a longitude and an altitude.

The terminal communication information is the information for communicating with the mobile terminal 2. The terminal communication information is, for example, an IP address of the mobile terminal 2, a media access control (MAC) address of the mobile terminal 2 or an identification (ID) of a communication application installed in the mobile terminal 2.

The receiver 12 receives various kinds of information and instructions from the mobile terminal 2 or the user terminal 3. The various kinds of information and instructions are, for example, the positional information, the inquiry, the video or the later described additional video.

The receiver 12 may receive the video while being paired with the positional information from each of one or a plurality of mobile terminals 2. In the above described case, it is preferable that the receiver 12 receives the video continuously. To receive the video continuously is, for example, to receive the video periodically or receive the video all of the time. The concept of "periodically" may include certain difference of the intervals.

The position receiver 121 receives the positional information from one or more mobile terminals 2. The position receiver 121 preferably receives the latest positional information from one or a plurality of mobile terminals 2 continuously. The position receiver 121 may receive a plurality of positional information sets corresponding to the video stored in the mobile terminal 2 from the mobile terminal 2. The position receiver 121 normally receives the positional information while being associated with the terminal identifier.

The inquiry receiver 122 receives the inquiry from the user terminal 3. It can be said that the inquiry is the request for the video captured at one or more locations on the route. The inquiry includes a route identification information. The inquiry includes, for example, a timing flag.

The route identification information is the information for identifying the route. The route identification information may be the route information including a plurality of positional information, the information of a start point and a destination, or a set of three or more location names. The structure and the contents of the route identification information are not limited as long as the route identification information can identify the route.

The timing flag is the information for identifying the kind of the video to be obtained. The timing flag is "realtime" which instructs to transmit the video captured in real time or "past" which instructs to transmit the video captured in the past and stored.

The processor 13 performs various kinds of processes. For example, the various kinds of processes are performed by the position accumulator 131, the terminal determination unit 132, the video obtainer 133, the video generator 134 and the right holder processor 135.

The processor 13 may accumulate the video received continuously by the receiver 12 while being associated with the positional information and the terminal identifier.

The processor 13 determines whether or not the latest positional information received by the receiver 12 is deviated from the route indicated by the route identification information. The positional information here is the positional information of the mobile terminal 2 currently transmitting the video.

The position accumulator 131 accumulates the positional information received by the position receiver 121 from the mobile terminal 2 in the terminal manager 111 while being associated with the mobile terminal 2. For example, the position accumulator 131 accumulates the positional information in the terminal manager 111 while being paired with the terminal identifier. It is preferable that the position accumulator 131 additionally writes the positional information in the terminal manager 111 while being associated with the mobile terminal 2.

The terminal determination unit 132 determines one or more mobile terminals 2 satisfying a route condition with respect to the received inquiry.

The route condition is the condition corresponding to the positional information identified by at least a part of the route identified by the route identification information. The route condition is the condition that the video is captured by the mobile terminal 2 at any positions on the route identified by the route identification information, that the mobile terminal 2 is located in any positions on the route identified by the route identification information or that the mobile terminal 2 has the video captured at one or more positions on the route identified by the route identification information.

For example, the terminal determination unit 132 determines one or more mobile terminals 2 corresponding to the positional information identifying at least a part of the route identified by the route identification information included in the received inquiry.

The terminal determination unit 132 may select only one or more mobile terminals 2 satisfying a selection condition when the terminal determination unit 132 determines a plurality of mobile terminals 2 corresponding to the positional information identifying at least a part of the route identified by the route identification information included in the received inquiry.

The selection condition is, for example, the condition that the mobile terminal 2 includes a plurality of positional information supporting the route identified by the route identification information by a predetermined rate or more. The selection condition is, for example, the condition that the rate of supporting the route identified by the route identification information is the maximum.

The terminal determination unit 132 may sort a plurality of mobile terminals 2 using sort information as a key when the terminal determination unit 132 determines a plurality of mobile terminals 2 corresponding to the positional information identifying at least a part of the route identified by the route identification information included in the received inquiry. The sort information is, for example, the rate where the route identified by a plurality of positional information associated with the mobile terminal 2 supports the route identified by the route identification information.

The video obtainer 133 obtains the video captured by one or a plurality of mobile terminals 2 satisfying the route condition.

For example, the video obtainer 133 obtains the first video corresponding to the positional information identifying the first partial route in the route identified by the route identification information, and obtains the second video corresponding to the positional information identifying the second partial route which is the route other than the first route in the route identified by the route identification information. Note that the first partial route and the second partial route are a part of the route identified by the route identification information. It is preferred that the first partial route and the second partial route are not the continuous route. It is preferred that the first partial route and the second partial route are not overlapped with each other. In the route identified by the route identification information, the second partial route is, for example, beyond (after) the first partial route.

For example, the video obtainer 133 obtains the video captured by one or a plurality of mobile terminals 2 determined by the terminal determination unit 132.

For example, the video obtainer 133 transmits the transmission instruction to one or a plurality of mobile terminals 2 determined by the terminal determination unit 132. For example, the video obtainer 133 receives the video from each of one or more mobile terminals 2. The above described video is, normally, the video transmitted immediately after the video is captured by the mobile terminal 2. The above described video is appropriately referred to as a realtime video.

For example, the video obtainer 133 transmits the transmission instruction including the route identification information to one or a plurality of mobile terminals 2 determined by the terminal determination unit 132. For example, the video obtainer 133 receives the video captured by each of one or more mobile terminals 2 in the route identified by the route identification information and accumulated in each of the mobile terminals 2 from each of the mobile terminals 2. The above described video is the video captured and accumulated in the mobile terminal 2 and is appropriately referred to as a past video.

For example, the video obtainer 133 obtains the video accumulated in the later described right holder processor 135 and the video captured at one or more positions on the route identified by the route identification information. The above described video is also appropriately referred to as a past video. For example, the video obtainer 133 examines the positional information paired with the past video accumulated in the right holder processor 135, and obtains the video corresponding to the positional information of one or more positions on the route identified by the route identification information. For example, the video obtainer 133 obtains the video using the later described access information.

For example, the video generator 134 combines each of a plurality of videos obtained by the video obtainer 133 in a time series manner to generate one video. Each of a plurality of videos is preferably the video capturing a plurality of different locations identified by the route identification information. Note that the one video combined in a time series manner is one video formed by combining a plurality of source videos. When a plurality of videos, which is a source of one video combined in a time series manner, is captured, it is preferred that the videos are temporally continued. However, the videos may be separated from each other. For example, one source video (source of one video) can be captured at 8:20 while the other source video (source of one video) can be captured at 8:25. The video generator 134 preferably combines a plurality of videos and generates one video in the order of the positions on the route identified by the route identification information. The combined one video is appropriately referred to as a combined video.

For example, the video generator 134 merges each of a plurality of videos obtained by the video obtainer 133 in a spatial manner to generate one video. The one video merged in a spatial manner is the video generated by constituting frames using a part or an entire of frames of each of the source videos and connecting the frames in a time series manner. Note that at least one frame constituting the one video is the frame including a part or an entire of the frames of each of the source videos. The one video merged in a spatial manner is approximately referred to as a merged video.

The video generator 134 may perform the process of transmitting the one video obtained by the video obtainer 133 to the video transmitter 141. It can be considered that the above described process is the process of generating one video. The process of transmitting the one video to the video transmitter 141 is normally the process of sequentially arranging the videos in a buffer for transmitting the video.

For example, the video generator 134 combines each of a plurality of videos obtained by the video obtainer 133 in the order of the time information associated with the video to generate one video. For example, the video generator 134 obtains a part of each of a plurality of videos obtained by the video obtainer 133, sequentially combines a part of the each of the videos and generates one video. The operation of combining each of a plurality of videos in a time series manner is normally the operation of sequentially combining a part of the videos captured by each of a plurality of mobile terminals 2 in a time series manner. The operation of sequentially connecting a part of the videos may be the operation of sequentially providing a part of the videos to the video transmitter 141. The operation of connecting the videos in the order of the time associated with the video is the operation of connecting the videos in the order of the time indicated in the time information associated with the video or the operation of sequentially connecting the videos in the order of the time when the video is received. It is enough if the video is viewed as one video for the user when the operation of combining a plurality of videos in a time series manner and generating one video is performed.

For example, the video generator 134 combines a part of each of a plurality of videos obtained by the video obtainer 133 and associated with different positional information in a spatial manner to generate one video. For example, the video generator 134 generates one video using a part or an entire of frames included in each of a plurality of videos obtained by the video obtainer 133 and generates one video by combining a plurality of frames in a time series manner.

The process of merging the frames included in each of a plurality of videos in a spatial manner is, for example, the following processes (a) (b).

(a) Method Based on Image Processing

For example, the video generator 134 performs the process of matching the direction and the scale of each of a plurality of frames as the object of connecting the videos in a spatial manner. Then, the video generator 134 detects identical regions in each of a plurality of frames, for example. Then, the video generator 134 performs the process of overlapping a plurality of frames having the identical regions to generate one frame with a wide area, for example. Note that it is possible to detect the identical regions in a plurality of frames using the conventionally known technology.

(b) Method Based on Machine Learning

For example, the video generator 134 gives a plurality of frames and learning models to the module for performing the prediction processing of the machine learning, executes the module, and obtains one frame with a wide area.

Note that the learning model is obtained by using a plurality of frames as an explanatory variable, gives a plurality of teacher data using one frame with a wide area generated from the plurality of frames as an objective variable to the module performing the learning process of the machine learning and executes the module.

The learning model may be also referred to as a learning device, a classifier, a classification model or the like. The algorithm of the machine learning is not limited. Although the deep learning is preferable, the random forest or other algorithms can be also used. For example, various existing functions and libraries of the machine learning such as a library of TensorFlow and a module of random forest of R language can be used for the machine learning.

The right holder processor 135 performs the right holder process. The right holder process is the process about the right holder identified by the right holder identifier associated with the video. For example, the right holder processor 135 performs the right holder process which is the process performed in response to the transmission of the video from the video transmitter 141 and the process about the right holder identified by the right holder identifier associated with the video. For example, the right holder process is the later-described first preservation process, the later-described second preservation process, the later-described third preservation process, the later-described fourth preservation process and the later-described rewarding process.

Note that the right holder identifier associated with one video is, for example, the right holder identifier associated with each of one or a plurality of videos which is the source of one video (combined video or merged video) or an identifier of the user who request the one video. The user who requested one video is the user of the user terminal 3 transmitting the inquiry.

The first preserver 1351 performs the first preservation process of accumulating one video generated by the video generator 134 while being associated with the attribute value set associated with each of one or a plurality of videos which is the source of the one video. The first preserver 1351 may perform the first preservation process of accumulating the video received from the mobile terminal 2 while being associated with the attribute value set associated with the video. Note that the attribute value set is one or more mobile attribute values.

The second preserver 1352 performs the second preservation process of accumulating one video generated by the video generator 134 while being associated with the right holder identifier corresponding to each of one or a plurality of videos which is the source of the one video.

Note that the first preserver 1351 or the second preserver 1352 may accumulate one video generated by the video generator 134 while being associated with the attribute value set associated with each of one or a plurality of videos which is the source of the one video and associated with the right holder identifier corresponding to each of one or a plurality of videos which is the source of the one video.

The third preserver 1353 accumulates the one video generated by the video generator 134 while being associated with the right holder identifier for identifying the user of the user terminal 3. Note that the user of the user terminal 3 here is the person viewing one video. The user terminal 3 here is, for example, the terminal transmitting the inquiry.

The destination in which one video is accumulated is, for example, the storage 11. However, one video may be accumulated in the other devices included in a blockchain.

The fourth preserver 1354 performs the fourth preservation process of accumulating a preservation information. The preservation information includes the access information for accessing the accumulated one video. The process of accumulating the videos and the fourth preservation process of the preservation information corresponding to the video may be performed in any order.

For example, the fourth preserver 1354 performs the fourth preservation process of accumulating the preservation information generated and accumulated in the video generator 134 including the access information for accessing the accumulated one video in a blockchain.

Note that the fourth preserver 1354 preferably accumulates the preservation information in a blockchain. Namely, the fourth preserver 1354 preferably accumulates the preservation information in a distributed ledger in a blockchain. The fourth preserver 1354 preferably registers the preservation information as an NFT (non-fungible token). The fourth preserver 1354 preferably registers the preservation information in a distributed file system in an IPFS (Inter Planetary File System) network.

The preservation information is the information for retaining the originality of the video. The preservation information is, in other words, the headline information of the video. The preservation information is, for example, the access information and the attribute value set. The preservation information preferably includes one or a plurality of right holder identifiers, for example. When the preservation information includes a plurality of right holder identifiers, the video may be shared by the right holders and the plurality of right holder identifiers may be right holder history information. The right holder history information is a set of right holder identifiers and information indicating the history of right holder changes. The fourth preservation process guarantees the originality of the preservation information of the registered video. The guarantee of the originality of the preservation information also guarantees the originality of the video corresponding to the preservation information. Note that the access information is the information for accessing the video. The access information is the information for identifying the destination in which the video is accumulated. The access information is, for example, URL and URI.

The preservation information preferably includes the information (also referred to a flag) indicating whether or not the video can be provided to a third party. The flag is, for example, the information indicating that the video is viewable by a third party, that the video may be for sale or that the video is neither viewable nor for sale.

For example, the rewarding unit 1355 performs the rewarding process for each of right holders identified by the right holder identifier associated with each of one or a plurality of videos which is the source of the one video generated by the video generator 134.

The rewarding process is a process of providing a reward. For example, the rewarding process is the process of increasing points managed in a manner paired with each of one or a plurality of right holder identifiers associated with the video. For example, the rewarding process is the process of paying money to the right holder identified by each of one or a plurality of right holder identifiers associated with the video. For example, the rewarding process is the process of transmitting the video or other contents to the user terminal 3 of the right holder identified by each of one or a plurality of right holder identifiers associated with the video. The rewarding process may be any processes of providing a merit to the right holder identified by each of one or a plurality of right holder identifiers associated with the video. The content of the rewarding process is not limited. The reward may be provided in any form, including money, points, products, and contents. The content of the reward is not limited.

The rewarding unit 1355 preferably obtains one or a plurality of video attribute values associated with each of one or a plurality of videos which is transmitted by the video transmitter 141 and is the source of one video, determines the reward to each of the plurality of right holders using one or more video attribute values and performs the rewarding process which is the process of providing the reward.

Here, one or more video attribute values are, for example, the data amount of the video, the time of the video, the number of frames of the video and the resolution of the video.

The rewarding unit 1355 preferably obtains a reward amount corresponding to a service identifier for identifying the service performed on the target video and performs the rewarding process which is the process of providing the reward corresponding to the reward amount. Note that the service identifier is, for example, "viewing" and "purchasing." In the above described case, the storage 11 stores the reward amount corresponding to the service identifier or the information for determining the reward amount corresponding to the service identifier.

For example, the rewarding unit 1355 obtains the reward amount and performs the rewarding process which is the process of providing the reward corresponding to the reward amount using one or a plurality of information of one or a plurality of video attribute values and service identifiers. In the above described case, an arithmetic expression or a table corresponding to each of a plurality of service identifiers is stored in the storage 11, for example. The arithmetic expression is the expression for calculating the reward amount using one or a plurality of video attribute values as parameters. The table includes a plurality of correspondence information for managing the reward amount corresponding to one or a plurality of video attribute values.

The rewarding unit 1355 normally performs the process of causing the user that has enjoyed the service relevant to the target video to pay the reward. The process of causing the user to pay the reward is, for example, the process of causing the user to pay the obtained reward amount. The process of causing the user to pay the reward is, for example, the process of causing the user to pay the obtained reward amount and the profit obtained by the management side of the information processing device 1. The process of causing the user to pay the reward is, for example, the process of reducing the points corresponding to the user receiving the service or the settlement process using the credit card number of the corresponding user.

The transmitter 14 transmits various kinds of information and instructions to the mobile terminal 2 or the user terminal 3. The various kinds of information and instructions are, for example, the video, the transmission instruction and the finish instruction. Note that the finish instruction is the instruction of stopping the transfer of the video.

The transmitter 14 transmits the finish instruction to the mobile terminal 2 when the latest positional information of the mobile terminal 2 transmitting the video is deviated from the route indicated by the route identification information.

The video transmitter 141 transmits the video generated by the video generator 134 to the user terminal 3. The video generated by the video generator 134 may be the video obtained by the video obtainer 133 as it is.

For example, the video transmitter 141 transmits the first video and the second video obtained by the video obtainer 133 to the user terminal 3. The video transmitter 141 preferably transmits the videos in the route identified by the route identification information in the order of the position.

<Detail of Components of Mobile Terminal 2>

The mobile storage 21 stores various kinds of information. The various kinds of information are, for example, the video, the attribute value set, the right holder identifier and the camera attribute value. The camera attribute value is the attribute value of the camera. The camera attribute value is, for example, an angle of view, a direction information and a resolution.

For example, one or more video attribute values included in the attribute value set is associated with one or more still images included in the video. One or more video attribute values may be associated with all still images, associated with a part of the still images, or associated with a plurality of still images.

The mobile receiver 22 receives various kinds of information. The various kinds of information are, for example, the transmission instruction or the finish instruction. A movement instruction receiver 221 receives the transmission instruction from the information processing device 1.

The mobile processor 23 performs various kinds of processes. The various kinds of processes are, for example, processes performed by the position obtainer 231, the image capturer 232, the attribute value obtainer 233 and the generator 234.

The position obtainer 231 obtains the positional information. The position obtainer 231 normally obtains the positional information for identifying the position of the mobile terminal 2. The position obtainer 231 obtains the positional information by a GPS receiver, for example. However, the method and the algorithm of obtaining the positional information by the position obtainer 231 are not limited.

The image capturer 232 captures the video. For example, the image capturer 232 captures the video during the movement of the mobile terminal 2. Note that the positional information obtained by the position obtainer 231 is preferably associated with the captured video. One or more video attribute values obtained by the later described attribute value obtainer 233 are preferably associated with the captured video.

The image capturer 232 preferably accumulates the captured video in the mobile storage 21. The image capturer 232 preferably overwrites the area storing old video with new video when the storage capacity of the mobile storage 21 for accumulating the video is limited. Namely, the mobile storage 21 preferably has a ring buffer structure.

The attribute value obtainer 233 obtains one or more camera attribute values including the direction information indicating the direction capturing the image capturer 232. The attribute value obtainer 233 preferably obtains one or a plurality of video attribute values including the camera attribute value.

The attribute value obtainer 233 obtains, for example, one or more video attribute values. The one or a plurality of video attribute values can be referred to as the attribute value set. The attribute value obtainer 233 obtains, for example, the time information from a not-illustrated clock during video capturing. The attribute value obtainer 233 obtains, for example, the time information continuously, at predetermined intervals, or when the obtaining condition is satisfied. The attribute value obtainer 233 obtains, for example, the time information from a not-illustrated clock during video capturing, and obtains the season information corresponding to the time information. The attribute value obtainer 233 obtains, for example, the weather information during video capturing. Even when the video is captured indoors, the weather information may be the information of the weather at the region similar to the indoors. The mobile processor 23 obtains, for example, the weather information corresponding to the positional information from a not-illustrated server. The mobile processor 23 obtains, for example, the weather information continuously, at predetermined intervals, or when the obtaining condition is satisfied. The attribute value obtainer 233 obtains, for example, the temperature information during video capturing. The mobile processor 23 obtains, for example, the temperature information corresponding to the positional information from a not-illustrated server. The mobile processor 23 obtains, for example, the temperature information from a temperature sensor installed in the movable body. The mobile processor 23 obtains, for example, the temperature information continuously, at predetermined intervals, or when the obtaining condition is satisfied. Note that the obtaining condition is, for example, when the analysis result of the video satisfies a predetermined condition.

The attribute value obtainer 233 obtains, for example, one or more tags corresponding to the video captured by the image capturer 232 and associates the one or more tags with the video. Note that it can be said that the tag is also the video attribute value.

For example, the attribute value obtainer 233 analyzes the video captured by the image capturer 232 and obtains one or more tags corresponding to the video.

For example, the attribute value obtainer 233 obtains one or more tags using one or a plurality of movable body attribute values obtained during video capturing by the image capturer 232. The movable body attribute value is, for example, CAN data.

For example, the attribute value obtainer 233 determines one or more still images satisfying the video tag condition and obtains the tag paired with the video tag condition. The attribute value obtainer 233 may associate the tag with one or more still images. Note that the still images are frames included in the video.

For example, when the video tag conditions are "the number of automobiles at a front-rear interval within a threshold value is equal to or greater than a threshold value and the speed of the automobiles is equal to or lower than a threshold value" and the tag paired with the video tag condition is "traffic jam," the tag attribute value obtainer 233 analyzes the frames included in the video, identifies a plurality of automobiles and obtains the interval between each pair of the plurality of automobiles. The attribute value obtainer 233 obtains the number of automobiles at the interval within the threshold value. The attribute value obtainer 233 obtains the movement distance of one automobile in a plurality of frames and the frame rate, and obtains the speed of the automobile. The attribute value obtainer 233 determines whether or not the video tag condition is satisfied using the number of automobiles at the interval within the threshold value and the speed of the automobile. When the video tag condition is satisfied, the attribute value obtainer 233 obtains the tag of "traffic jam" paired with the video tag condition. The attribute value obtainer 233 may associate the tag of "traffic jam" with the analyzed frame of the analyzed video.

For example, the attribute value obtainer 233 determines one or more movable body attribute values satisfying the attribute value tag condition and obtains the tag paired with the attribute value tag condition. The attribute value obtainer 233 may associate the tag with the video paired with the one or more movable body attribute values.

For example, when the attribute value tag condition is "the travel at the speed lower than 30 km lasts for 10 minutes or longer and the rate of the travel duration at the speed lower than 30 km/h is 80% or higher" and the tag paired with the attribute value tag condition is "traffic jam," the attribute value obtainer 233 detects the CAN data satisfying the attribute value tag condition using the history of the speed included in the CAN data associated with each field included in the video, obtains the tag of "traffic jam" paired with the attribute value tag condition, and associates the tag with the field associated with the CAN data. The CAN data associated with each field included in the video is the CAN data obtained at the same time as when the field is captured.

The generator 234 associates the obtained positional information with the video and obtains the additional video. For example, the generator 234 obtains the additional video in which one or more camera attribute values obtained by the attribute value obtainer 233 are also associated with the video. For example, the generator 234 obtains the additional video in which one or more video attribute values obtained by the attribute value obtainer 233 are also associated with the video. The additional video is the video to which one or more video attribute values are added. The above described one or more video attribute values normally include the positional information.

The mobile transmitter 24 transmits various kinds of information to the information processing device 1. The various kinds of information are, for example, the positional information, the video or the additional video. The mobile transmitter 24 may transmit the video obtained by the image capturer 232 continuously to the information processing device 1. In the above described case, the positional information is normally associated with the video.

When the finish instruction is received, the mobile transmitter 24 preferably finishes the transmission of the video.

The position transmitter 241 transmits the positional information obtained by the position obtainer 231 to the information processing device 1.

It is preferred that the position transmitter 241 continuously transmits the positional information to the information processing device 1. The concept of "continuously" includes the concepts of "always" and "periodically." The concept of "periodically" means that the transmission interval may be slightly varied. The frequency and the interval of transmitting the positional information by the position transmitter 241 are not limited.

For example, the mobile video transmitter 242 transmits the video captured by the image capturer 232 when the movement instruction receiver 221 receives the transmission instruction. The mobile video transmitter 242 preferably transmits the additional video.

For example, when the movement instruction receiver 221 receives the transmission instruction, the mobile processor 23 obtains the past video paired with one or more positional information corresponding to the route identified by the route identification information included in the transmission instruction from the mobile storage 21, and the mobile video transmitter 242 transmits the past video. The mobile video transmitter 242 preferably transmits the additional video.

The mobile output unit 25 outputs various kinds of information. The various kinds of information are, for example, the video, the additional video and the attribute value set.

The output is the concept including the operation of displaying on a display, the operation of projecting with a projector, the operation of printing with a printer, the operation of outputting sound, the operation of transmitting to an external device, the operation of accumulating in a recording medium, and the operation of delivering a processed result to another processor or another program.

The video output unit 251 outputs the video. The video output unit 251 preferably outputs the additional video. The output here may be the accumulation in the mobile storage 21.

<Detail of Components of User Terminal 3>

The user storage 31 stores various kinds of information. The various kinds of information are, for example, the user identifier, the video, the inquiry and the map information.

The user acceptor 32 accepts various kinds of instructions and information. The various kinds of instructions and information are, for example, the inquiry, the position instruction, the purchase instruction and the route identification information. Note that the inquiry may include the purchase instruction. The route identification information may be the destination.

The acceptance is the concept including the acceptance of the information inputted from input devices such as a keyboard, a mouse and a touch panel, the acceptance of the information transmitted via a communication line with wired or wireless communication, and the acceptance of the information read from recording media such as an optical disk, a magnetic disk and a semiconductor memory.

The position instruction is the instruction of the position on the route in the outputted map. The position instruction here is the instruction for outputting the video of the corresponding position.

The purchase instruction is the instruction for purchasing the video. The purchase instruction is associated with the user identifier. The purchase instruction normally includes the information identifying the video. The purchase instruction includes, for example, a video identifier. The purchase instruction includes, for example, an inquiry. The purchase instruction includes, for example, a purchase condition. The purchase condition is, for example, a purchase price. The purchase condition includes, for example, the information identifying a right period.

The various kinds of instructions and information may be input in any manner, such as with a touch panel, a keyboard, a mouse or a menu screen.

The user processor 33 performs various kinds of processes. The various kinds of processes are, for example, the processes related to the data structure for transmitting various kinds of instructions and information received by the user acceptor 32. The various kinds of processes are, for example, the processes related to the structure of transmitting the information received by the user receiver 35.

The user processor 33 obtains the video corresponding to the positional information indicating the location of the position instruction received by the user acceptor 32. The above described video is a part or an entire of the videos received by the user receiver 35.

For example, when the destination is accepted, the user processor 33 obtains the route identification information using the current position and the destination. Note that the above described process is conventionally known process in the navigation terminal.

The user transmitter 34 transmits various kinds of instructions and information to the information processing device 1. The various kinds of instructions and information are, for example, inquiries and purchase instructions.

The user transmitter 34 transmits, for example, the inquiry including the route identification information for identifying the route. The timing and the trigger of transmitting the inquiry by the user transmitter 34 is not limited. For example, when the route is set, the user transmitter 34 transmits the inquiry including the route identification information for identifying the route.

The user receiver 35 receives the video when the inquiry is transmitted. The user receiver 35 normally receives the video from the information processing device 1. For example, when the inquiry is transmitted, the user receiver 35 receives the positional information of the mobile terminal 2 located on the route identified by the route identification information. For example, when the inquiry is transmitted, the user receiver 35 receives a thumbnail image included in the video captured by the mobile terminal 2 located in the positions on the route identified by the route identification information.

The user output unit 36 outputs the map using the map information of the user storage 31. The user output unit 36 outputs the map indicating the route indicated by the route identification information obtained by the user processor 33.

The user output unit 36 outputs the map indicating the positions (locations) at which the video can be obtained in the route. The positions at which the video can be obtained are the positions indicated by the positional information of each of one or more mobile terminals 2 received by the user receiver 35. For example, the user output unit 36 outputs the thumbnail image received by the user receiver 35. It is preferred that the user output unit 36 outputs the thumbnail image while being associated with the position indicated by the positional information associated with the thumbnail image.

The user output unit 36 outputs the video received by the user receiver 35.

The storage 11, the terminal manager 111, the mobile storage 21 and the user storage 31 are preferably a nonvolatile recording medium. However, these storages may be a volatile recording medium.

The process of storing the information in the storage 11 or the like is not limited. For example, the information may be stored in the storage 11 or the like via a recording medium, the information transmitted via a communication line or the like may be stored in the storage 11 or the like, or the information inputted by an input device may be stored in the storage 11 or the like.

The receiver 12, the position receiver 121, the inquiry receiver 122, the mobile receiver 22 and the user receiver 35 are normally implemented by a wireless or wired communication means. However, these receivers may be implemented by a means for receiving a broadcast.

The processor 13, the position accumulator 131, the terminal determination unit 132, the video obtainer 133, the video generator 134, the right holder processor 135, the first preserver 1351, the second preserver 1352, the third preserver 1353, the fourth preserver 1354, the rewarding unit 1355, the mobile processor 23, the attribute value obtainer 233, the generator 234 and the user processor 33 may normally be implemented by a processor, a memory or the like. The processing procedure of the processor 13 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

The transmitter 14, the video transmitter 141, the mobile transmitter 24, the position transmitter 241, the mobile video transmitter 242 and the user transmitter 34 are normally implemented by a wireless or wired communication means. However, these transmitters may be implemented by a broadcast means.

The position obtainer 231 is achieved, for example, by a GPS receiver.

The image capturer 232 includes a camera capable of capturing the video. Note that the type of the camera is not limited.

The mobile output unit 25, the video output unit 251 and the user output unit 36 may or may not include an output device such as a display or a speaker. The mobile output unit 25 may be implemented by a driver software of an output device or implemented by a driver software of an output device and the output device, for example.

The user acceptor 32 may be implemented by a device driver of an input device such as a touch panel and a keyboard or a control software of a menu screen, for example.

<Operation>

Then, the operation example of the information system A will be explained. First, the operation example of the information processing device 1 will be explained using the flowchart in FIG. 4. Note that "S" shown in each flowchart used in the following explanation means the step.

(S401) The position receiver 121 determines whether or not the positional information is received from the mobile terminal 2. When the positional information is received, the processing proceeds to S402. When the positional information is not received, the processing proceeds to S403. Note that the received positional information is associated with the terminal identifier. Here, the receiver 12 may receive the video from the mobile terminal 2 while being paired with one or a plurality of positional information. The receiver 12 may receive the positional information and one or more video attribute values.

(S402) The position accumulator 131 additionally writes the positional information received in S401 in the terminal manager 111 while being associated with the terminal identifier. The processing returns to S401. Note that the processor 13 may accumulate the video while being paired with one or a plurality of positional information.

(S403) The inquiry receiver 122 determines whether or not the inquiry is received from the user terminal 3. When the inquiry is received, the processing proceeds to S404. When the inquiry is not received, the processing returns to S401. Note that the inquiry is normally associated with the user identifier of the user transmitting the inquiry.

(S404) The terminal determination unit 132 obtains the route information included in the inquiry received in S403. Alternatively, the terminal determination unit 132 obtains the route information using the route identification information included in the inquiry. Note that the route information is a set of a plurality of positional information.

(S405) The terminal determination unit 132 determines whether the inquiry received in S403 is the inquiry indicating the realtime video (approximately, referred to as "realtime") or the inquiry indicating that the video accumulated in the past (approximately, referred to as "past") may be included. When the video is obtained in realtime, the processing proceeds to S406. When the video is obtained in the past, the processing proceeds to S413.

For example, the terminal determination unit 132 determines whether "realtime" or "past" based on the value of a timing flag included in the inquiry.

(S406) The terminal determination unit 132 determines one or more mobile terminals 2 capable of transmitting the video in real time. An example of the above described terminal determination process will be explained using the flowchart in FIG. 5. Note that the mobile terminal 2 capable of transmitting the video in realtime is the mobile terminal 2 currently capturing the video at any positions included in the route identified by the route information.

(S407) The video obtainer 133 substitutes 1 for a counter i.

(S408) The video obtainer 133 determines whether or not the i-th mobile terminal 2 exists in the mobile terminals 2 determined in S406. When the i-th mobile terminal 2 exists, the processing proceeds to S409. When the i-th mobile terminal 2 does not exist, the processing returns to S401.

(S409) The video obtainer 133 obtains the terminal communication information of the i-th mobile terminal 2 from the terminal manager 111. The video obtainer 133 transmits the transmission instruction of the video to the i-th mobile terminal 2 using the terminal communication information.

(S410) The receiver 12 determines whether or not the video is received from the i-th mobile terminal 2. When the video is received, the processing proceeds to S411. When the video is not received, the processing returns to S410. Here, it is preferable to wait until the video is received from the mobile terminal 2 transmitting the transmission instruction.

Here, the receiver 12 may receive only the positional information instead of the video from the i-th mobile terminal 2 or receive both the positional information and the thumbnail image.

(S411) The processor 13 generates the information including the positional information of the i-th mobile terminal 2 to be transmitted to the user terminal 3. The transmitter 14 transmits the above described information to the user terminal 3.

Note that the above described information is, for example, the positional information of the i-th mobile terminal 2 and the still image (e.g., thumbnail image) included in the video transmitted from the mobile terminal 2. The above described information is, for example, the positional information of the i-th mobile terminal 2 and the video.

(S412) The video obtainer 133 increments the counter i by 1. The processing returns to S408.

(S413) The video obtainer 133 performs the process of obtaining the past video. An example of the above described past video obtaining process will be explained using the flowchart in FIG. 6. Note that the past video is the video accumulated in the information processing device 1 or the video accumulated in the mobile storage 21 of the mobile terminal 2.

(S414) The video transmitter 141 transmits the video obtained in S413 to the user terminal 3. The processing returns to S401.

(S415) The receiver 12 determines whether or not the video or the like is received from the mobile terminal 2. When the video or the like is received, the processing proceeds to S416. When the video or the like is not received, the processing proceeds to S421. Note that the video or the like is, for example, the video, the terminal identifier and the attribute value set.

(S416) The processor 13 temporarily accumulates the video or the like received in S415 in a not-illustrated buffer. Note that the destination for accumulating the video or the like may be, for example, the storage 11. The destination is not limited.

(S417) The processor 13 determines whether or not the video received from the mobile terminal 2 identified by the terminal identifier included in the video or the like received in S415 is currently transmitted to the user terminal 3. When the video is currently transmitted, the processing proceeds to S418. When the video is not currently transmitted, the processing returns to S401.

(S418) The processor 13 determines whether or not the route condition is satisfied. When the route condition is satisfied, the processing proceeds to S419. When the route condition is not satisfied, the processing proceeds to S420.

Note that the route condition here is the condition that the latest positional information paired with the terminal identifier included in the video or the like received in S415 is the positional information of the position on the route indicated by the route information corresponding to the inquiry. When the route condition is not satisfied, the transmitter 14 preferably transmits the finish instruction to the mobile terminal 2.

(S419) The video transmitter 141 transmits the video received in S415 to the user terminal 3.

(S420) The right holder processor 135 performs a preservation process. The example of the preservation process will be explained using the flowchart in FIG. 7.

(S421) The receiver 12 determines whether or not the position instruction is received from the user terminal 3. When the position instruction is received, the processing proceeds to S422. When the position instruction is not received, the processing proceeds to S425.

(S422) The video obtainer 133 obtains the positional information corresponding to the position instruction. The video obtainer 133 obtains the video at the position indicated by the positional information.

For example, the video obtainer 133 obtains the terminal identifier corresponding to the obtained positional information and obtains the video paired with the terminal identifier from a not-illustrated buffer.

For example, the video obtainer 133 obtains the terminal identifier corresponding to the obtained positional information and transmits the transmission instruction to the mobile terminal 2 identified by the terminal identifier. The video obtainer 133 receives the video from the mobile terminal 2.

(S423) The video transmitter 141 transmits the video obtained in S422 to the user terminal 3 from which the position instruction is transmitted.

(S424) The processor 13 determines whether or not the transmission of the video to the user terminal 3 will be finished. When the transmission will be finished, the processing proceeds to S420. When the transmission will not be finished, the processing returns to S422. The case of finishing the transmission is, for example, when the instruction of finishing the transmission is received from the user terminal 3.

(S425) The receiver 12 determines whether or not the purchase instruction is received from the user terminal 3. When the purchase instruction is received, the processing proceeds to S426. When the purchase instruction is not received, the processing returns to S401.

(S426) The video obtainer 133 obtains the video corresponding to the purchase instruction. For example, the video obtainer 133 obtains the video corresponding to the purchase instruction from the videos accumulated in the right holder processor 135.

(S427) The fourth preserver 1354 obtains the user identifier corresponding to the user terminal 3 transmitting the purchase instruction. Note that the user identifier functions as the right holder identifier corresponding to the purchased video.

(S428) The fourth preserver 1354 performs the fourth preservation process using the user identifier obtained in S427. The example of the fourth preservation process will be explained using the flowchart in FIG. 8.

(S429) The rewarding unit 1355 performs the rewarding process to the original right holder of the video to be purchased. The processing returns to S401. The example of the rewarding process will be explained using the flowchart in FIG. 9.

Figure 4:
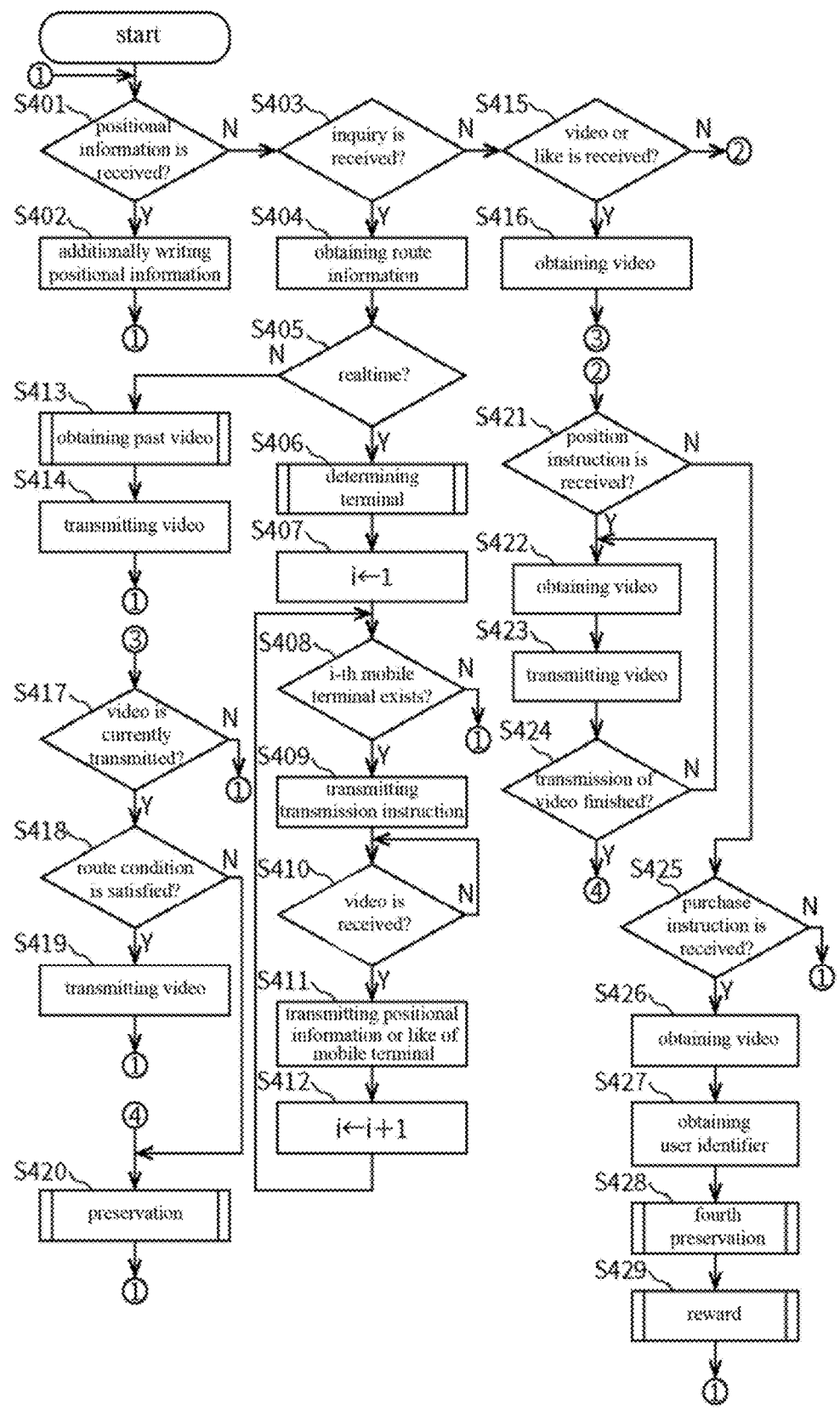
FIG. 4 is a flowchart for explaining an operation example of the information processing device 1 in the first embodiment.

In the flowchart in FIG. 4, the process ends when the power is turned off or the instruction of ending process is interrupted.

Figure 5:
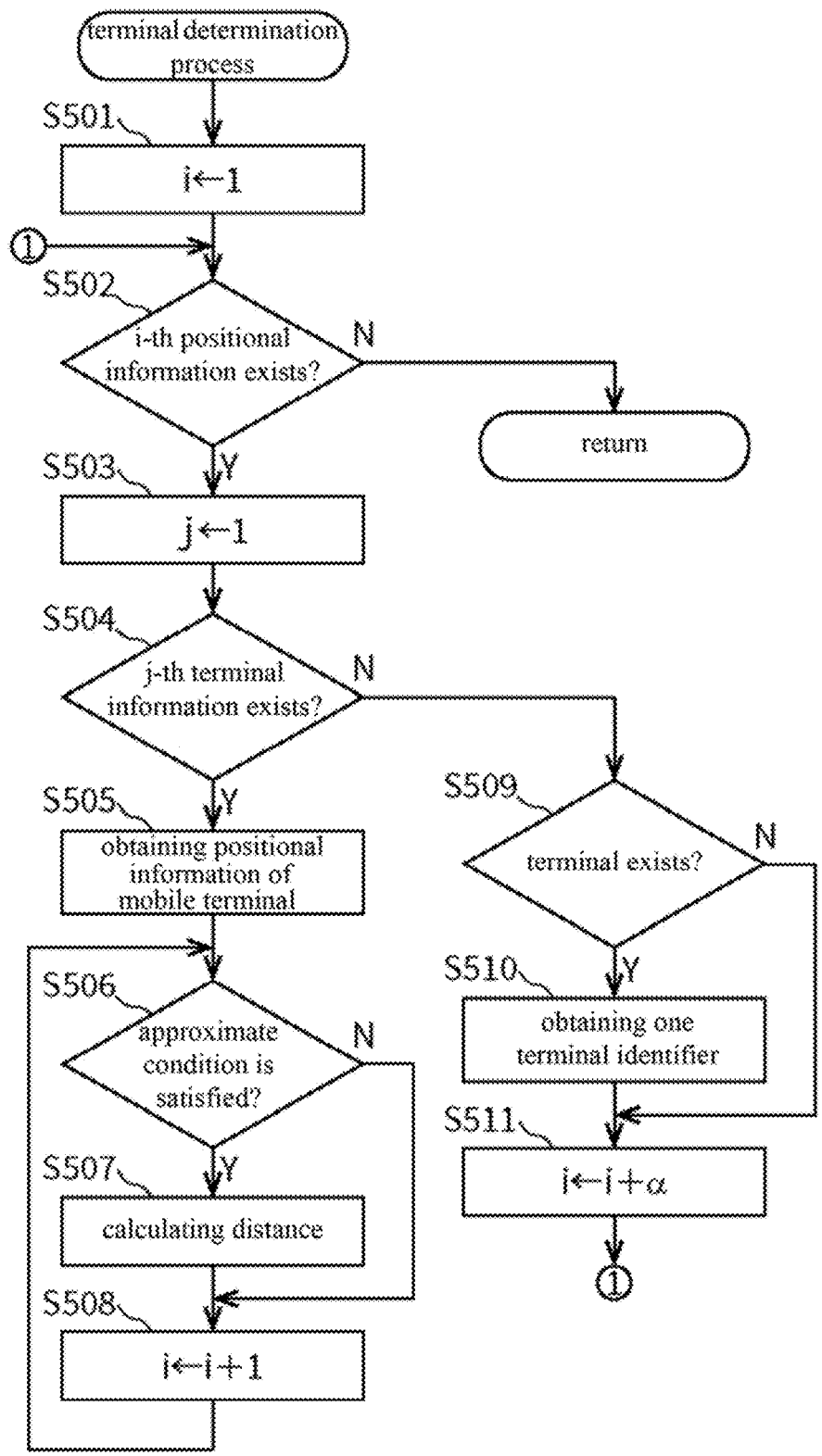
FIG. 5 is a flowchart for explaining an example of a terminal determination process.

Then, the example of the terminal determination process in S406 will be explained using the flowchart in FIG. 5.

(S501) The terminal determination unit 132 substitutes 1 for a counter i.

(S502) The terminal determination unit 132 determines whether or not the i-th positional information exists in the route information obtained in S404. When the i-th positional information exists, the processing proceeds to S503. When the i-th positional information does not exist, the processing returns to the upstream process.

(S503) The terminal determination unit 132 substitutes 1 for a counter j.

(S504) The terminal determination unit 132 determines whether or not the j-th terminal information exists in the terminal manager 111. When the j-th terminal information exists, the processing proceeds to S505. When the j-th terminal information does not exist, the processing proceeds to S509.

(S505) The terminal determination unit 132 obtains the latest positional information included in the j-th terminal information.

(S506) The terminal determination unit 132 determines whether or not an approximate condition is satisfied between the i-th positional information in the route information and the latest positional information of the mobile terminal 2. When the approximate condition is satisfied, the processing proceeds to S507. When the approximate condition is not satisfied, the processing proceeds to S508.

Note that the approximate condition means that two positions (locations) are close (near) to each other. For example, the approximate condition means that the distance indicated by two positions is within a threshold value or less than the threshold value.

(S507) The terminal determination unit 132 calculates the distance between two positions using two positional information. The terminal determination unit 132 temporarily accumulates the distance while being paired with the terminal identifier of the mobile terminal 2.

(S508) The terminal determination unit 132 increments the counter j by 1. The processing returns to S504.

(S509) The terminal determination unit 132 determines whether or not the mobile terminal 2 satisfying the approximate condition exists. When the mobile terminal 2 exists, the processing proceeds to S508. When the mobile terminal 2 does not exist, the processing proceeds to S511.

(S510) The terminal determination unit 132 obtains the terminal identifier of the mobile terminal 2 having the minimum distance.

(S511) The terminal determination unit 132 adds a to the counter i. Note that a is a natural number of 1 or more. The processing returns to S502.

When the terminal identifier of the mobile terminal 2 can be obtained in S510, a is a plurality of large values. When the terminal identifier of the mobile terminal 2 cannot be obtained, a is preferably a small value such as 1 which is smaller than the values when the terminal identifier can be obtained.

Then, the example of the past video obtaining process in S413 will be explained using the flowchart in FIG. 6.

(S601) The video obtainer 133 substitutes 1 for a counter i.

(S602) The video obtainer 133 determines whether or not the i-th positional information exists in the route information obtained in S404. When the i-th positional information exists, the processing proceeds to S603. When the i-th positional information does not exist, the processing returns to the upstream process.

(S603) The video obtainer 133 substitutes 1 for a counter j.

(S604) The video obtainer 133 refers to the terminal manager 111 and determines whether or not the j-th mobile terminal 2 (j-th terminal information) capable of transmitting the video exists. When the j-th mobile terminal 2 exists, the processing proceeds to S605. When the j-th mobile terminal 2 does not exist, the processing proceeds to S610.

(S605) The video obtainer 133 obtains a positional information set paired with the terminal identifier of the j-th mobile terminal 2 from the terminal manager 111. Note that the positional information set is one or more positional information. It is assumed that the video corresponding to the positional information set is captured by the mobile terminal 2 and stored in the mobile storage 21.

(S606) The video obtainer 133 determines whether or not the i-th positional information satisfies the route condition with respect to the positional information set obtained in S605. When the route condition is satisfied, the processing proceeds to S607. When the route condition is not satisfied, the processing proceeds to S609. Note that the route condition here is the condition that the i-th positional information is the information indicating the position on the route identified by the positional information set.

(S607) The video obtainer 133 obtains the positional information set which is one or more positional information included in the positional information set obtained in S605, is the positional information set included in the route information obtained in S404 and is a set of one or more positional information of the i-th positional information or later in the route information. The above described positional information set is the information for identifying the route included in the video possessed by the j-th mobile terminal 2.

(S608) The video obtainer 133 calculates the distance of the route identified by the positional information set obtained in S607.

(S609) The video obtainer 133 increments the counter j by 1. The processing returns to S604.

(S610) The video obtainer 133 substitutes 1 for a counter k.

(S611) The video obtainer 133 determines whether or not k-th past video exists in the past videos which are the videos preserved in S420. When the k-th past video exists, the processing proceeds to S612. When the k-th past video does not exist, the processing proceeds to S617.

(S612) The video obtainer 133 obtains the positional information set corresponding to the past video.

(S613) The video obtainer 133 determines whether or not the i-th positional information satisfies the route condition with respect to the positional information set obtained in S125. When the route condition is satisfied, the processing proceeds to S614. When the route condition is not satisfied, the processing proceeds to S616. Note that the route condition here is the condition that the i-th positional information is the information indicating the position on the route identified by the positional information set obtained in S612.

(S614) The video obtainer 133 obtains the positional information set which is one or more positional information included in the positional information set obtained in S612, is the positional information set included in the route information obtained in S404 and is a set of one or more positional information of the i-th positional information or later included in the route information. The above described positional information set is a set of the positional information identifying the route overlapping with the route indicated by the route information in the route corresponding to the past video.

(S615) The video obtainer 133 calculates the distance of the route identified by the positional information set obtained in S614.

(S616) The video obtainer 133 increments the counter k by 1. The processing returns to S613.

(S617) The video obtainer 133 determines whether or not the route condition is satisfied one or more times in S606 or S614. When the route condition is satisfied, the processing proceeds to S618. When the route condition is not satisfied, the processing proceeds to S619.

(S618) The video obtainer 133 obtains the terminal identifier of the mobile terminal 2 which has the maximum distance calculated in S608 or S615 or the identifier of the past video. When the video obtainer 133 obtains the terminal identifier, the video obtainer 133 transmits the transmission instruction of the video including the positional information set corresponding to the distance to the mobile terminal 2 identified by the terminal identifier and receives the video on the route indicated by the positional information set from the mobile terminal 2. When the video obtainer 133 obtains the identifier of the past video, the video or the like identified by the identifier from a storage area indicated by the access information of the video.

(S619) The video obtainer 133 increases the value of the counter i. The processing returns to S602.

Note that the video obtainer 133 preferably increases the value of the counter i by 1 when the route condition is not satisfied. It is preferable to increase the value of the counter i by 2 or more when the route condition is satisfied.

Then, the example of the preservation process in S420 will be explained using the flowchart in FIG. 7.

(S701) The right holder processor 135 accumulates the transmitted video while being associated with the attribute value set associated with each of one or a plurality of videos which is the source of the transmitted video.

Note that the right holder processor 135 preferably accumulates the video while being paired with the right holder identifier for identifying each of one or a plurality of right holders. The right holder identifier here is, for example, one or more right holder identifiers of the video which is the source of the accumulated video. The right holder identifier here is, for example, one right holder identifier for identifying the user transmitting the inquiry.

For example, the right holder processor 135 accumulates the video in the storage 11 or another devise than the information processing device 1. Another device than the information processing device 1 may be a device included in a blockchain.

(S702) The fourth preserver 1354 performs the fourth preservation process. The example of the fourth preservation process is explained using the flowchart in FIG. 9.

(S703) The right holder processor 135 substitutes 1 for a counter i.

(S704) The right holder processor 135 determines whether or not the i-th video which is the source of the accumulated video exists. When the i-th video exists, the processing proceeds to S705. When the i-th video does not exist, the processing returns to the upstream process.

(S705) The rewarding unit 1355 performs the rewarding process. The example of the rewarding process will be explained using the flowchart in FIG. 9. The rewarding process here is the rewarding process to the right holder of the i-th video which is the source of the accumulated video.

(S706) The right holder processor 135 determines whether or not to change the right holder of the i-th video which is the source of the accumulated video. When the right holder is changed, the processing proceeds to S707. When the right holder is not changed, the processing proceeds to S708.

Whether or not to change the right holder may be determined based on the flag associated with the i-th video, may be preliminarily determined, or may be changed when "the information indicating the change request of the right holder" is included in the inquiry.

(S707) The right holder processor 135 obtains the user identifier of the user terminal 3. Note that the above described user identifier becomes a new right holder identifier.

(S708) The first preserver 1351 accumulates the i-th video which is the source of the accumulated video.

(S709) The fourth preserver 1354 performs the fourth preservation process related to the i-th video which is the source of the accumulated video. The example of the fourth preservation process is explained using the flowchart in FIG. 9.

(S710) The right holder processor 135 increments the counter i by 1. The processing returns to S704.

Figure 7:
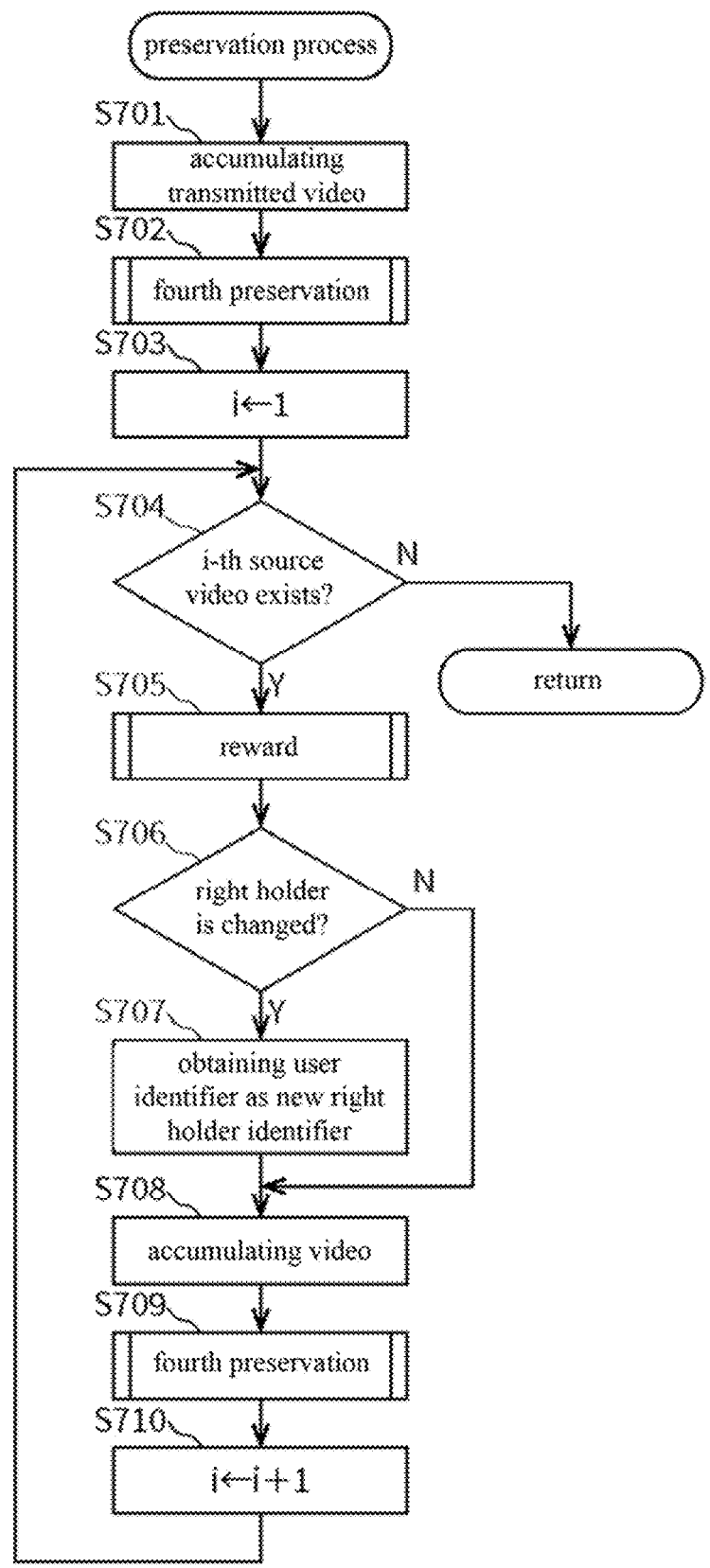
FIG. 7 is a flowchart for explaining an example of a preservation process in the first embodiment.

In the flowchart in FIG. 7, the process (S708) of accumulating a plurality of videos which is the source of the combined video and the fourth preservation process (S709) are performed when the combined video is generated. However, the above described processes can be omitted.

Figure 8:
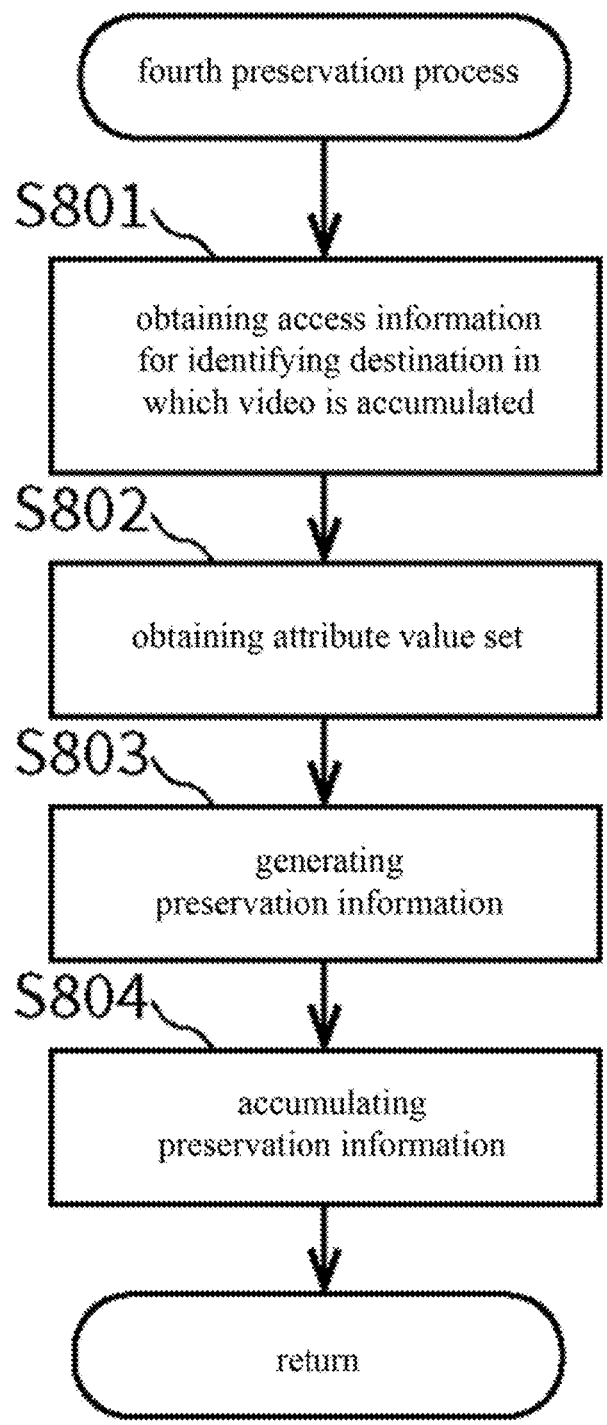
FIG. 8 is a flowchart for explaining an example of a fourth preservation process in the first embodiment.

Then, the example of the fourth preservation process in S702 and S709 will be explained using the flowchart in FIG. 8.

(S801) The fourth preserver 1354 obtains the access information for identifying the destination of accumulating the video. Note that the above described video is, for example, the merged video and the combined video.

(S802) The fourth preserver 1354 obtains the attribute value set corresponding to the accumulated video. When the accumulated video is the video generated from a plurality of source videos, the attribute value set corresponding to the video is the attribute value set of each video which is a plurality of source videos.

(S803) The fourth preserver 1354 generates the preservation information including the access information obtained in S801, the attribute value set obtained in S802 and the right holder identifier of the video. When new right holder identifier is obtained, the fourth preserver 1354 generates, for example, the preservation information including the new right holder identifier and the original right holder identifier.

(S804) The fourth preserver 1354 accumulates the preservation information generated in S803. The processing returns to the upstream process.

When the preservation information of the video corresponding to the preservation information to be accumulated is accumulated in S804, the preservation information is overwritten on the preservation information generated in S803. By the above described operation, the transition of the right holder of the video can be managed. The fourth preserver 1354 accumulates the preservation information in a blockchain, for example.

Then, the example of the rewarding process will be explained using the flowchart in FIG. 9.

(S901) The rewarding unit 1355 obtains one or a plurality of right holder identifiers of the target video. The rewarding unit 1355 may obtain the right holder identifier of the past right holder of the target video.

(S902) The rewarding unit 1355 obtains the attribute value set of the target video.

(S903) The rewarding unit 1355 obtains the service identifier for identifying the service performed on the target video. The service identifier is, for example, "viewing" and "purchasing."

(S904) The rewarding unit 1355 obtains the reward amount using the attribute value set obtained in S902 and one or a plurality of information of the service identifier obtained in S903.

When a plurality of right holder identifiers is obtained, the rewarding unit 1355 obtains the reward amount to each of the right holder identifiers. When the history information of the right holder including a plurality of right holder identifiers is obtained, the rewarding unit 1355 may obtain the reward amount to each of the right holder identifiers.

For example, the rewarding unit 1355 preferably obtains the video attribute value corresponding to each of a plurality of videos which is the source of the video and transmitted by the video transmitter 141 and determines the reward amount of each of a plurality of right holders using the video attribute value. For example, the rewarding unit 1355 preferably determines the reward amount so that the reward amount increases as the data amount, the time of the video or the number of the frames of the original video adopted in the video transmitted by the video transmitter 141 increases. For example, the rewarding unit 1355 preferably determines the reward amount so that the reward amount increases as the resolution of the original video adopted in the video transmitted by the video transmitter 141 increases.

(S905) The rewarding unit 1355 performs the process of providing the reward to the right holder identified by the right holder identifier obtained in S901 by the reward amount obtained in S904.

(S906) The rewarding unit 1355 performs the process of causing the user that has enjoyed the service relevant to the target video to pay the reward. The processing returns to the upstream process. Note that the target video is normally the video transmitted to the user terminal 3.

Figure 9:
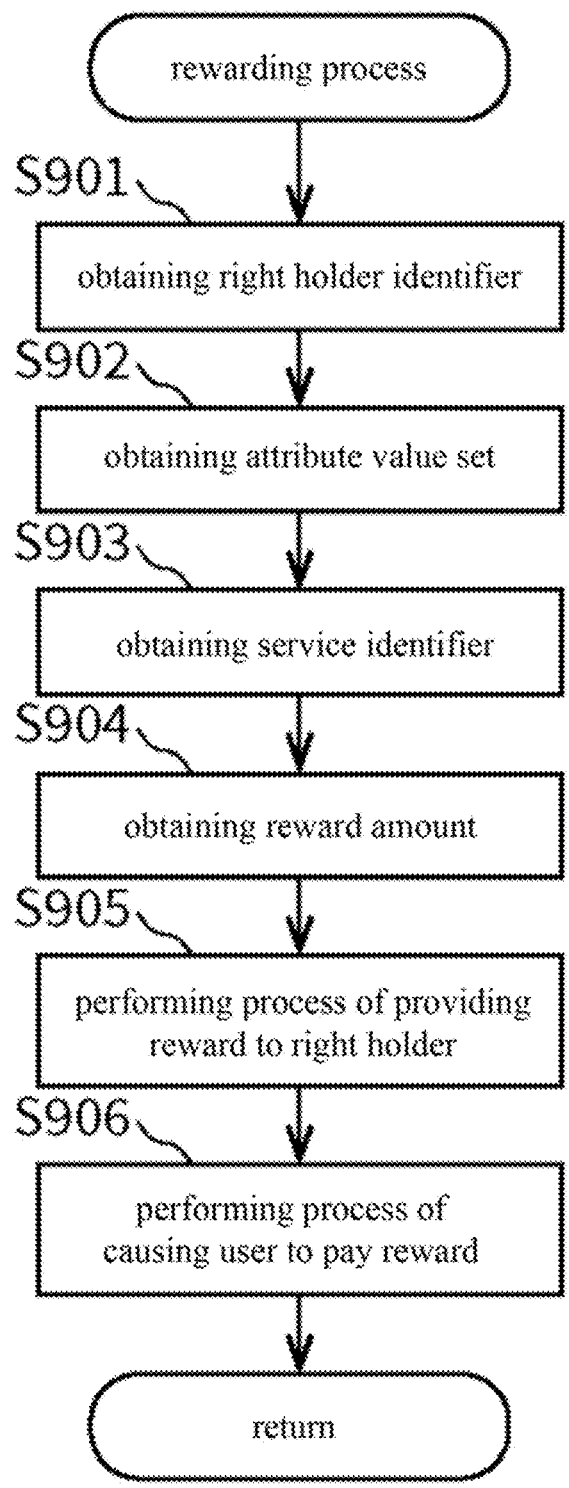
FIG. 9 is a flowchart for explaining an example of a rewarding process in the first embodiment.

In the flowchart in FIG. 9, it is possible to obtain the profit obtained by the management side of the information processing device 1 and accumulates the profit.

Then, the operation example of the mobile terminal 2 will be explained using the flowchart in FIG. 10.

(S1001) The mobile terminal 2 determines whether or not a start instruction is received. When the start instruction is received, the processing proceeds to S1002. When the start instruction is not received, the processing proceeds to S1011. Note that the start instruction is, for example, the start instruction of a video transmission application or turning on of the mobile terminal 2.

(S1002) The position obtainer 231 obtains the positional information.

(S1003) The attribute value obtainer 233 obtains one or more video attribute values excluding the positional information.

(S1004) The generator 234 obtains the terminal identifier from the mobile storage 21.

(S1005) The generator 234 generates the information to be transmitted including the positional information and one or more video attribute values and the terminal identifier. The position transmitter 241 transmits the information generated in S1005 to the information processing device 1.

(S1006) The image capturer 232 captures the image and obtains the video.

(S1007) The generator 234 generates the additional video including the video, the positional information, one or more video attribute values and the terminal identifier. The generator 234 accumulates the additional video in the mobile storage 21.

(S1008) The mobile video transmitter 242 determines whether or not to transmit the video in the information processing device 1. When the video will be transmitted, the processing proceeds to S1009. When the video will not be transmitted, the processing proceeds to S1010. The case of transmitting the video is, for example, when a transmission flag is "ON." The initial value of the transmission flag is "OFF."

(S1009) The mobile video transmitter 242 transmits the additional video accumulated in S1007 to the information processing device 1. Note that the amount of the video transmitted at once is not limited.

(S1010) The mobile processor 23 determines whether or not the transmission of the positional information or the like will be finished. When the transmission will be finished, the processing returns to S1001. When the transmission will not be finished, the processing returns to S1002. The case of not finishing the transmission of the positional information or the like is, for example, when the end instruction is received from the user.

(S1011) The movement instruction receiver 221 determines whether or not the transmission instruction of the video is received from the information processing device 1. When the transmission instruction is received, the processing proceeds to S1002. When the transmission instruction is not received, the processing returns to S1001.

(S1012) The mobile processor 23 determines whether the transmission instruction received in S1011 is the transmission instruction of the realtime video or the transmission instruction of the past video. In case of the transmission instruction of the realtime video, the processing proceeds to S1013. In case of the transmission instruction of the past video, the processing proceeds to S1014.

Note that the mobile processor 23 may determine whether the transmission instruction of the realtime video or the transmission instruction of the past video based on the timing flag included in the transmission instruction. When the transmission instruction does not include the positional information set, the mobile processor 23 determines that the transmission is the transmission instruction of the realtime video. When the transmission instruction includes the positional information set, the mobile processor 23 determines that the transmission instruction is the transmission instruction of the past video.

(S1013) The mobile processor 23 sets the transmission flag to "ON." The processing returns to S1002.

(S1014) The mobile processor 23 obtains the positional information set included in the transmission instruction.

(S1015) The mobile processor 23 obtains the video or the like corresponding to a plurality of positional information associated with the positional information set obtained in S1014 from the mobile storage 21. The video or the like is preferably a so-called additional video. However, the video or the like may be only the video.

(S1016) The mobile video transmitter 242 transmits the additional video obtained in S1015 to the information processing device 1.

(S1017) The mobile receiver 22 determines whether or not the finish instruction is received from the information processing device 1. When the finish instruction is received, the processing proceeds to S1018. When the finish instruction is not received, the processing returns to S1001.

(S1018) The mobile processor 23 sets the transmission flag to "OFF." The processing returns to S1002.

Figure 10:
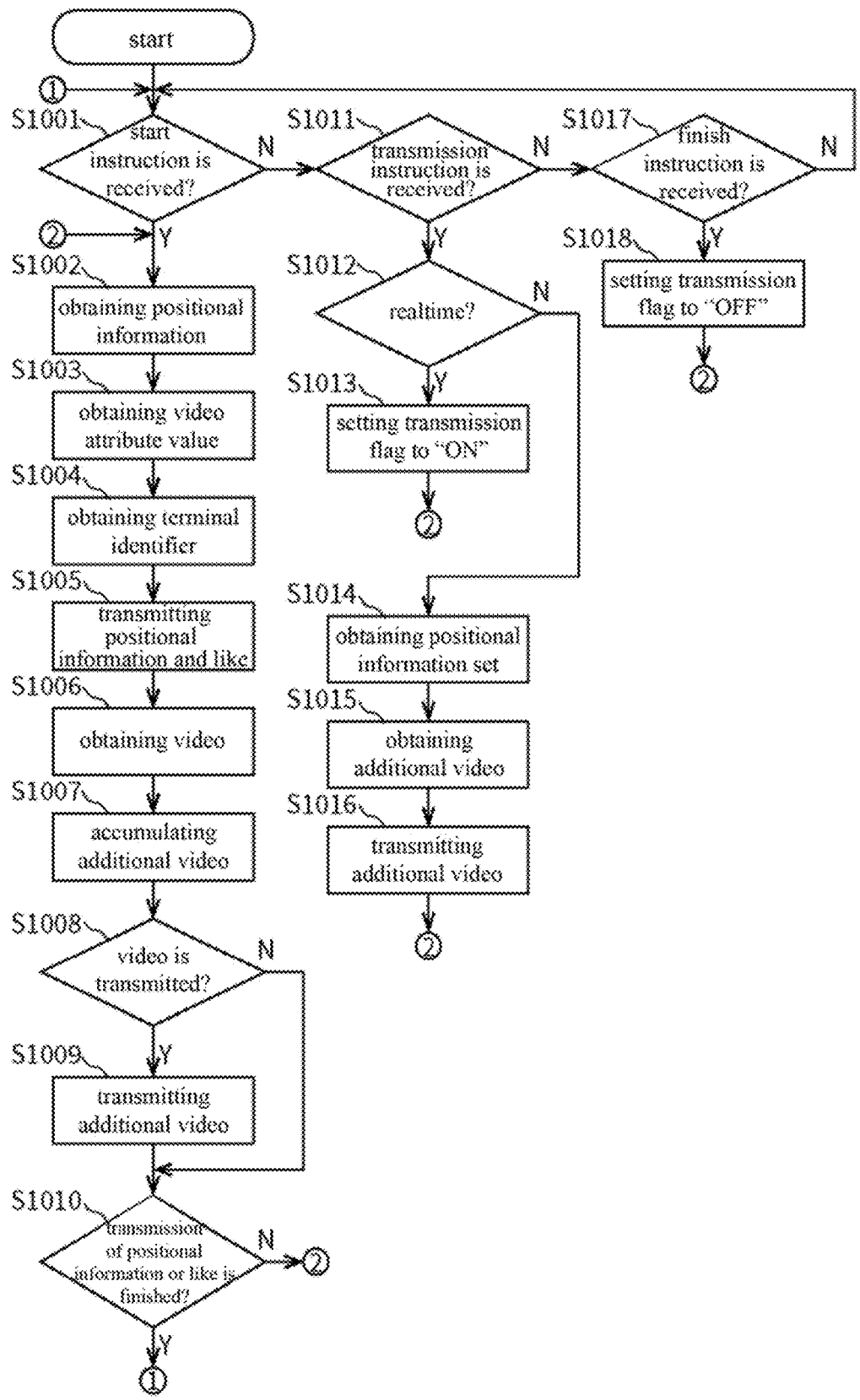
FIG. 10 is a flowchart for explaining an operation example of a mobile terminal 2 in the first embodiment.

In the flowchart in FIG. 10, the process ends when the power is turned off or the instruction of ending process is interrupted.

Then, the operation example of the user terminal 3 will be explained using the flowchart in FIG. 11.

(S1101) The user acceptor 32 determines whether or not the route identification information is received. When the route identification information is received, the processing proceeds to S1102. When the route identification information is not received, the processing proceeds to S1117.

(S1102) The user processor 33 obtains the route identification information. Note that the route identification information received in S1101 is the destination. The route identification information may be a plurality sets of positional information obtained as a result of searching the route by the route identification information using the current position and the destination. Namely, the route identification information received in S1101 and the route identification information obtained here may not be necessarily the same information.

(S1103) The user processor 33 obtains the map information of the user storage 31. Then, the user processor 33 generates the map information indicating the route identified by the route identification information on the map information. The user output unit 36 outputs the map indicating the route using the map information.

(S1104) The user processor 33 generates the inquiry including the route identification information obtained in S1102. The user transmitter 34 transmits the inquiry to the information processing device 1.

Here, the user processor 33 may perform the processes of S1104 to S1116 only when the inquiry flag of the user storage 31 is "ON." Namely, when the inquiry flag is "OFF," the video is not outputted to the user terminal 3. It is assumed that the inquiry flag can be changed.

(S1105) The user receiver 35 determines whether or not the information is received from the information processing device 1 when the inquiry is transmitted. When the information is received, the processing proceeds to S1106. When the information is not received, the processing proceeds to S1113.

(S1106) The user processor 33 determines whether or not the video is included in the information received in S1105. When the video is included, the processing proceeds to S1107. When the video is not included, the processing proceeds to S1109.

(S1107) The user output unit 36 outputs one or a plurality of videos in the information received in S1105. Note that the user output unit 36 preferably indicates the position indicated by the positional information corresponding to the video on the map.

(S1108) The user processor 33 determines whether or not to finish the output of the information. When the output will be finished, the processing returns to S1101. When the output will not be finished, the processing returns to S1105.

(S1109) The user processor 33 obtains the positional information set in the information received in S1105.

(S1110) The user processor 33 generates the map indicating the position indicated by each positional information included in the positional information set obtained in S1109. The user output unit 36 outputs the map.

(S1111) The user processor 33 determines whether or not the thumbnail image exists in the information received in S1105. When the thumbnail image exists, the processing proceeds to S1112. When the thumbnail image does not exist, the processing returns to S1105. Note that the thumbnail image is one image in the video.

(S1112) The user output unit 36 outputs one or more thumbnail images in the information received in S1105. Note that the user output unit 36 preferably outputs the thumbnail image in a state that the position indicated by the positional information paired with the image is indicated.

(S1113) The user processor 33 determines whether or not a timeout is satisfied. When the timeout is satisfied, the process returns to S1101. When the timeout is not satisfied, the process proceeds to S1114. Note that the timeout is the fact that a predetermined time or more has passed after the inquiry is transmitted.

(S1114) The user acceptor 32 determines whether or not the position instruction is received. When the position instruction is received, the processing proceeds to S1115. When the position instruction is not received, the processing returns to S1105.

(S1115) The user processor 33 or the like obtains the video paired with the positional information corresponding to the position instruction.

For example, the user transmitter 34 transmits the transmission instruction to the mobile terminal 2 corresponding to the positional information associated with the position instruction. The user receiver 35 receives the video from the mobile terminal 2. The user processor 33 obtains the video.

(S1116) The user output unit 36 outputs the video obtained in S1115.

(S1117) The user acceptor 32 determines whether or not the purchase instruction is received from the user. When the purchase instruction is received, the processing proceeds to S1118. When the purchase instruction is not received, the processing returns to S1101. Note that the purchase instruction includes, for example, the inquiry.

(S1118) The user processor 33 generates the purchase instruction to be transmitted. Then, the user transmitter 34 transmits the purchase instruction to the information processing device 1 while being associated with the user identifier.

(S1119) The user receiver 35 determines whether or not the information is received from the information processing device 1. When the information is received, the processing proceeds to S1120. When the information is not received, the processing returns to S1119. Note that the information is, for example, the video, the information indicating the fact that the transfer of the right holder is finished, and the attribute value set of the video.

(S1120) The user processor 33 generates the information to be transmitted using the received information. The user output unit 36 outputs the information. The processing returns to S1101.

Figure 11:
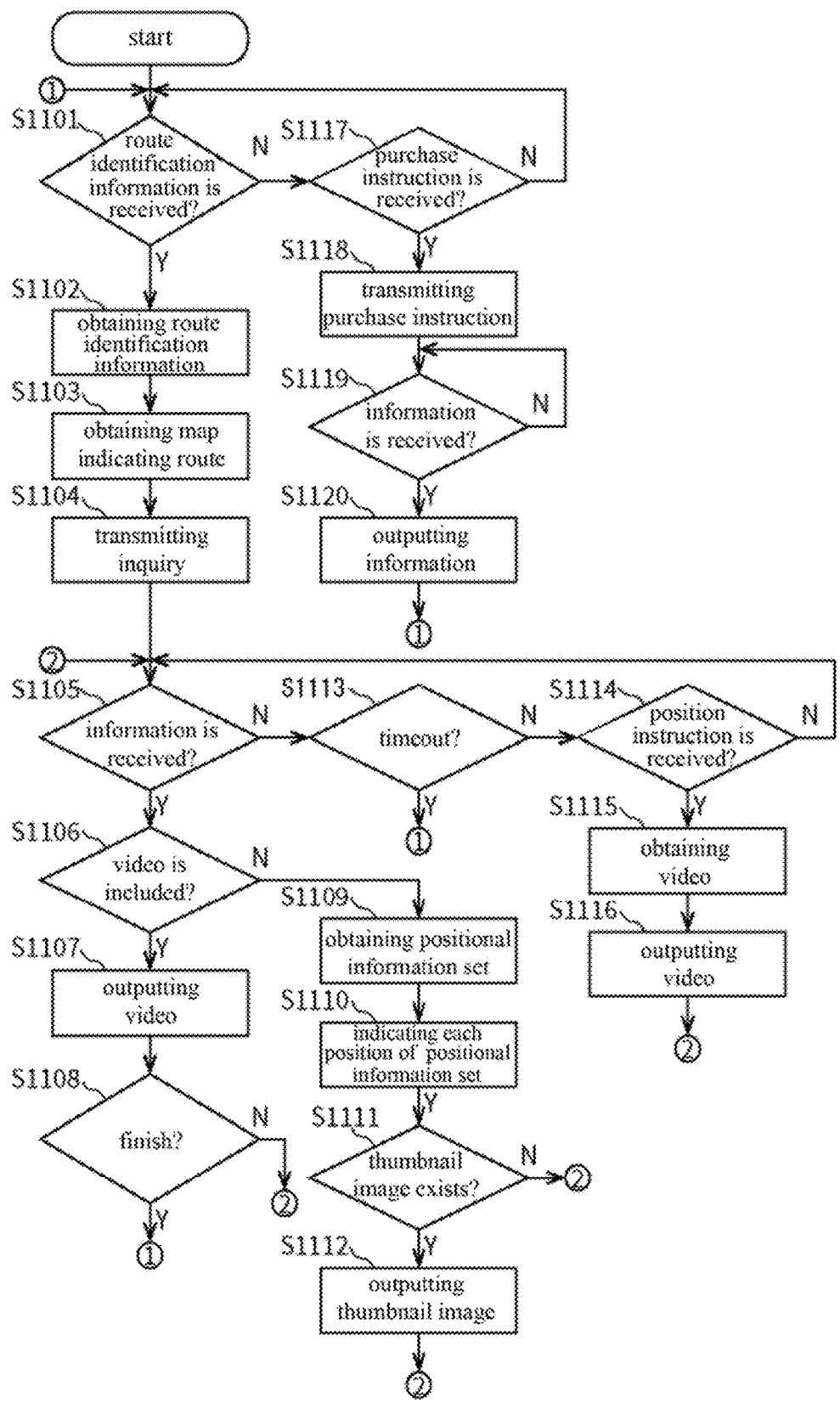
FIG. 11 is a flowchart for explaining an operation example of a user terminal 3 in the first embodiment.

In the flowchart in FIG. 11, the process ends when the power is turned off or the instruction of ending process is interrupted.

Hereafter, specific examples of the operation of the information system A in the present embodiment will be explained. Hereafter, two specific examples will be explained. Specific Example 1 is the case when the realtime video based on the route identification information is outputted from the user terminal 3. Specific Example 2 is the case when the past video based on the route identification information is outputted from the user terminal 3.

Specific Example 1

It is assumed that a terminal management table having the structure shown in FIG. 12 is currently stored in the terminal manager 111 of the information processing device 1. The terminal management table is the table for managing one or more terminal information. The terminal management table manages one or more records including "ID," "terminal identifier," "terminal communication information" and "attribute value set." Here, "attribute value set" includes "time" and "positional information."

After the mobile terminal 2, which is a drive recorder mounted on an automobile, receives the start instruction from the user A, the position obtainer 231 obtains the positional information (x, y). The attribute value obtainer 233 obtains one or more video attribute values such as time. The generator 234 generates the information including the positional information, one or more video attribute values and the terminal identifier to be transmitted. Then, the position transmitter 241 transmits the generated information to the information processing device 1. The image capturer 232 captures the image and obtains the video. Then, the generator 234 generates the additional video including the video, the positional information, one or more video attribute values and the terminal identifier. The generator 234 accumulates the additional video in the mobile storage 21. The mobile terminal 2 repeats the above described processes.

A large number of other mobile terminals 2 perform the processes similar to the above described processes of the mobile terminal 2. Note that the large number of other mobile terminals 2 may be a drive recorder mounted on an automobile, a glasses-type terminal with a camera equipped with a person, or a smartphone mounted on a bicycle.

The position receiver 121 of the information processing device 1 receives the positional information or the like from each of the mobile terminals 2. The position accumulator 131 additionally writes the received positional information or the like in the terminal management table while being associated with the terminal identifier. As a result, the terminal management table shown in FIG. 12 is generated.

In the above described situation, it is assumed that the user A inputs the destination into the user terminal 3 which is the navigation terminal mounted on the automobile.

Figure 13:
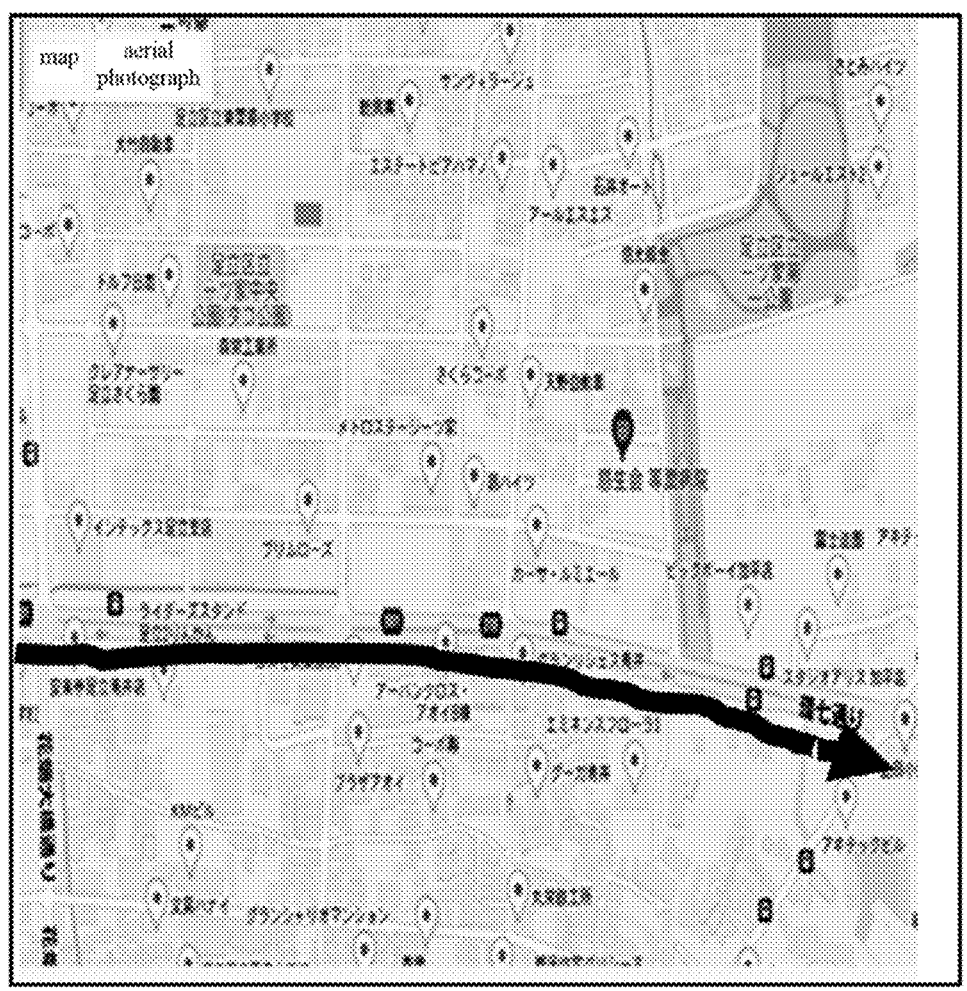
FIG. 13 is a drawing showing an output example in the first embodiment.

Then, the user acceptor 32 of the user terminal 3 receives the route identification information which is the destination. Then, the user processor 33 obtains the current position by a GPS receiver. Then, the user processor 33 searches for a route using the current position and the destination and obtains the route information including a plurality of positional information for identifying the route from the current position to the destination. As shown in FIG. 13, the map on which the route is drawn is outputted to the user terminal 3.

Then, the user processor 33 of the user terminal 3 obtains the inquiry flag stored in the user storage 31. Then, the user processor 33 detects that the user storage 31 is "inquiry flag=ON" and generates the inquiry including the obtained route information and the timing flag "realtime." Then, the user transmitter 34 transmits the inquiry to the information processing device 1.

Then, the inquiry receiver 122 of the information processing device 1 receives the inquiry from the user terminal 3. Then, the terminal determination unit 132 obtains the route information including the received inquiry. The terminal determination unit 132 determines that the received inquiry includes the timing flag "realtime."

Then, the terminal determination unit 132 refers to the terminal management table (FIG. 12) and determines one or more mobile terminals 2 capable of transmitting the realtime video on the route indicated by the route information included in the inquiry. Namely, with the processes explained in the flowchart in FIG. 5, the terminal determination unit 132 determines one or a plurality of positional information satisfying the approximate condition with respect to any one of the positional information indicating the position on the route indicated by the positional information set included in the received inquiry from the positional information paired with the latest time of each of the mobile terminals 2 in the terminal management table and obtains the terminal identifier paired with each of the positional information and the terminal communication information from the terminal management table (FIG. 12).

Then, the video obtainer 133 transmits the transmission instruction of the video to one or more mobile terminals 2 using each of one or more terminal communication information. Note that the video obtainer 133 transmits the transmission instruction including the timing flag "realtime."

Then, the movement instruction receiver 221 of each of one or more mobile terminals 2 receives the transmission instruction. Then, the mobile processor 23 of each of the mobile terminals 2 determines that the transmission instruction is the transmission instruction of the realtime video from the timing flag "realtime" included in the received transmission instruction.

Then, the position obtainer 231 of each of the mobile terminals 2 obtains the positional information. The attribute value obtainer 233 of each of the mobile terminals 2 obtains one or more video attribute values. The generator 234 obtains the terminal identifier from the mobile storage 21. The generator 234 generates the information including the positional information, one or more video attribute values and the terminal identifier. The image capturer 232 captures the image and obtains the video. Then, the generator 234 generates the additional video including the video, the positional information, one or more video attribute values and the terminal identifier. The generator 234 accumulates the additional video in the mobile storage 21. Then, the mobile video transmitter 242 transmits the information including the positional information, one or more video attribute values and the terminal identifier and the thumbnail image which is one still image in the video to the information processing device 1. Note that the mobile video transmitter 242 of each of the mobile terminals 2 here may transmit the additional image to the information processing device 1. The position transmitter 241 of each of the mobile terminals 2 preferably repeats to transmit the information including the positional information, one or more video attribute values and the terminal identifier to the information processing device 1.

Then, the receiver 12 of the information processing device 1 receives the information including the positional information, one or more video attribute values, the terminal identifier and the thumbnail image from each of the mobile terminals 2. Then, the processor 13 generates the information to be transmitted to the user terminal 3, the information including the positional information of each of the mobile terminals 2 and the thumbnail image. The transmitter 14 transmits the information to the user terminal 3.

Then, the user receiver 35 of the user terminal 3 receives the information including the positional information of each of the mobile terminals 2 and the thumbnail image from the information processing device 1. The user processor 33 generates the map indicating the position indicated by each of the positional information on the map. Then, the user output unit 36 outputs the map. The user output unit 36 outputs one or more thumbnail images while being associated with the position indicated by the positional information. The above described output image is FIG. 14.

Figure 14:
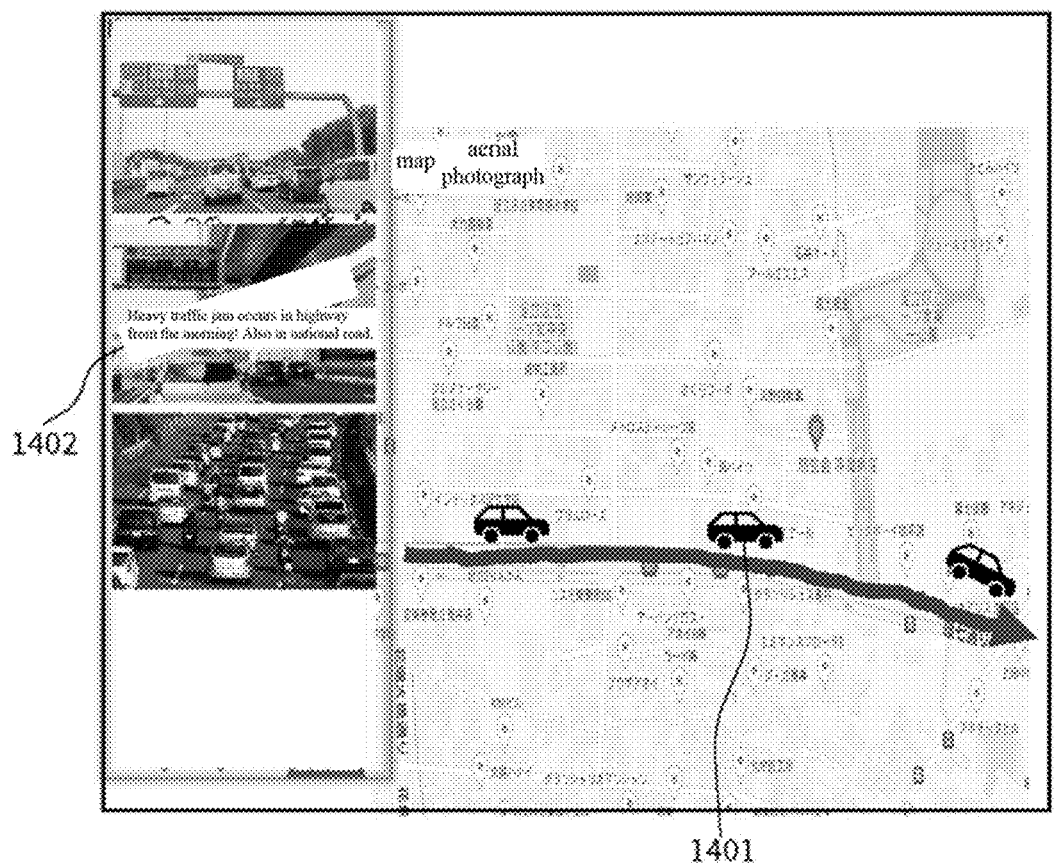
FIG. 14 is a drawing showing an output example in the first embodiment.

Then, it is assumed that the user performs the instruction about one position (here, icon of automobile) 1401 or one thumbnail image 1402 in the output screen of FIG. 14. Thus, the user acceptor 32 of the user terminal 3 accepts the position instruction. Then, the user transmitter 34 transmits the transmission instruction including the timing flag "realtime" to the mobile terminal 2 identified by the terminal identifier corresponding to the position instruction.

Then, the mobile receiver 22 of the mobile terminal 2 receives the transmission instruction. Then, the mobile processor 23 confirms the timing flag "realtime." The image capturer 232 obtains the video which is currently captured. Then, the mobile video transmitter 242 transmits the video to the information processing device 1.

Then, the receiver 12 of the information processing device 1 receives the video. Then, the video transmitter 141 transmits the video to the user terminal 3.

Figure 15:
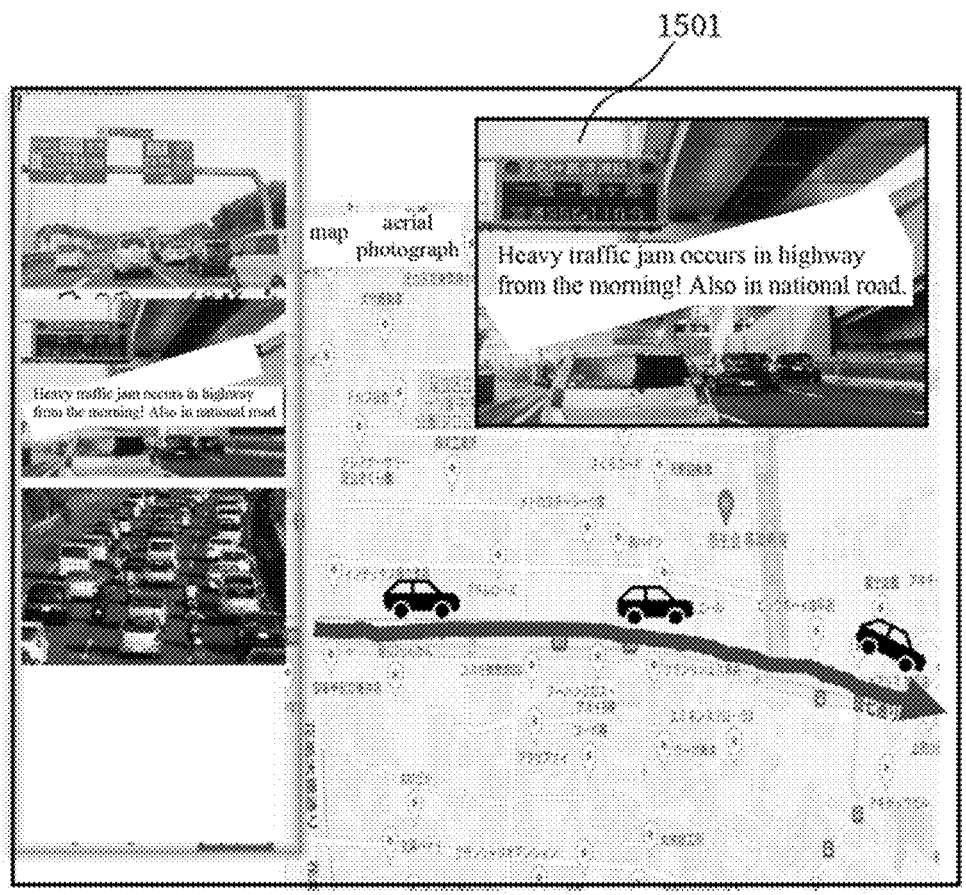
FIG. 15 is a drawing showing an output example in the first embodiment.

Then, the user receiver 35 of the user terminal 3 receives the video. Then, the user output unit 36 outputs the video. The above described output image is FIG. 15. The outputted video is 1501.

The right holder processor 135 of the information processing device 1 performs the preservation process explained using the flowchart in FIG. 7 on the video transmitted to the user terminal 3.

As described above, in this specific example, the realtime video on the route can be provided to the user based on the route identification information.

Specific Example 2

It is assumed that the terminal manager 111 of the information processing device 1 currently stores the terminal management table shown in FIG. 12.

It is assumed that the user B walks holding the user terminal 3 which is the smartphone. As a result, it is assumed that the route information identifying the route where the user B walked is stored in the user storage 31 of the user terminal 3. It is assumed that the route information is a set of a plurality of positional information.

It is assumed that the user B then inputs the inquiry including the positional information set into the user terminal 3. Then, the user acceptor 32 of the user terminal 3 accepts the inquiry. The user processor 33 obtains the user identifier of the user storage 31 and generates the inquiry including the user identifier, the route information and the timing flag "past." Then, the user transmitter 34 transmits the inquiry to the information processing device 1.

Then, the inquiry receiver 122 of the information processing device 1 receives the inquiry. Then, the terminal determination unit 132 obtains the route information included in the received inquiry.

Figure 6:
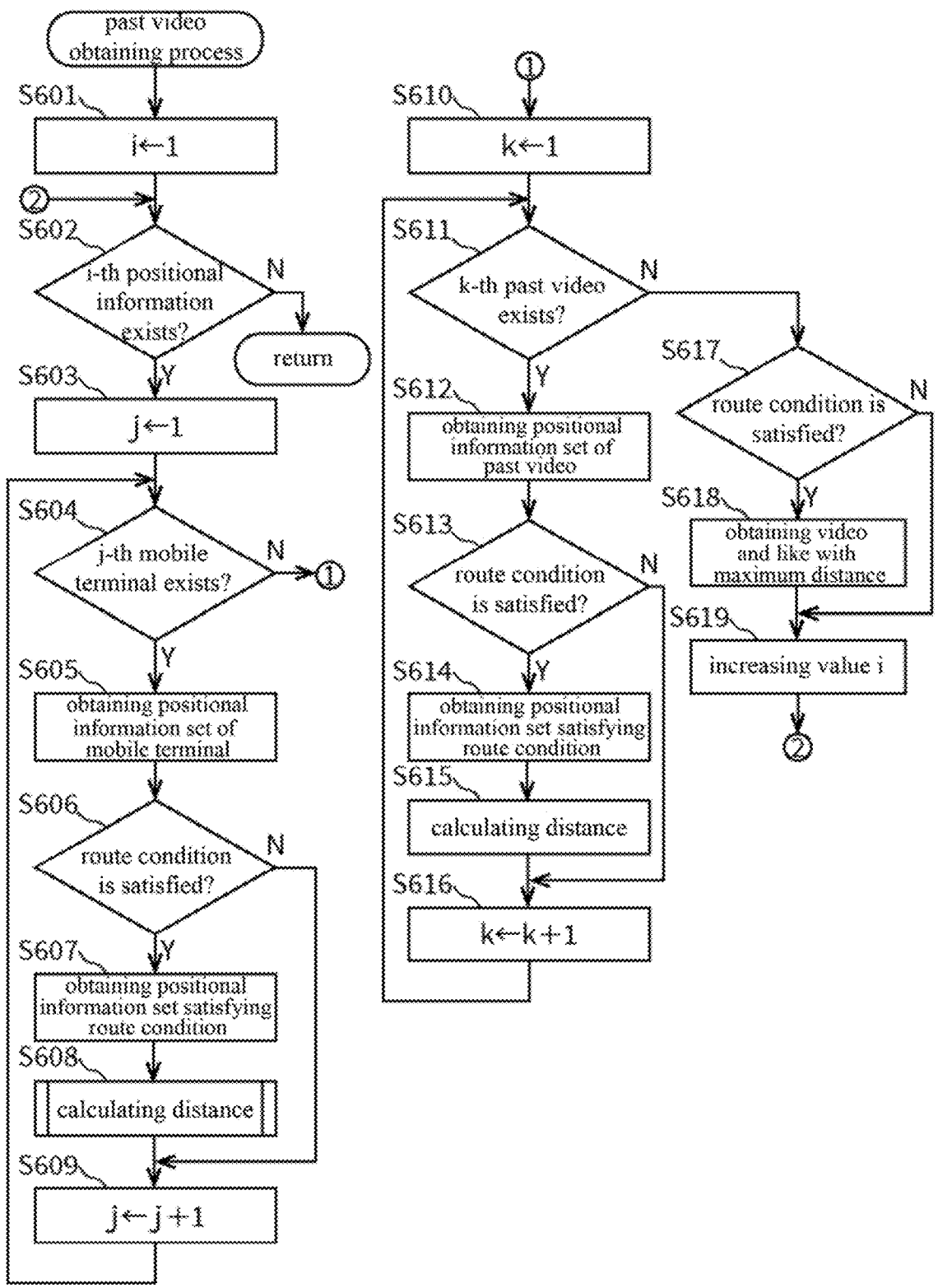
FIG. 6 is a flowchart for explaining an example of a past video obtaining process.

Then, the video obtainer 133 performs the process of obtaining the past video based on the timing flag "past" with the process explained in the flowchart in FIG. 6. Namely, the video obtainer 133 obtains one or a plurality of videos satisfying the route condition from the videos stored in the mobile terminal 2 managed by the terminal management table (FIG. 12) or the videos accumulated by the preservation process in the order of the positional information included in the route information. When a plurality of videos is obtained, the video generator 134 obtains the combined video which is the video formed by combining the obtained plurality of videos in a time series manner in the order of the positional information included in the route information.

Then, the video transmitter 141 transmits the combined video to the user terminal 3. The right holder processor 135 performs the preservation process on the video.

Then, the user receiver 35 of the user terminal 3 receives the combined video. The user output unit 36 outputs the video.

As described above, in this specific example, the past video on the route can be provided to the user based on the route identification information.

As described above, in the present embodiment, the information processing device 1 can be a platform for appropriately providing the video of each position on the route.

In the present embodiment, the information processing device 1 can be a platform for appropriately providing the video of a plurality of positions on the route.

In the present embodiment, a platform for providing the video of each position on the route with less burden on the mobile terminal can be provided.

In the present embodiment, the burden of the platform for appropriately providing the video of each position on the route can be reduced.

In the present embodiment, an appropriate process related to the right holder of the video can be performed.

In the present embodiment, the reward can be provided to the right holder of the video captured by the mobile terminal.

In the present embodiment, an appropriate reward can be provided to the right holder of the video captured by the mobile terminal.

In the present embodiment, the video can be preserved.

In the present embodiment, an appropriate right holder can be set to the right holder of the video.

The processes in the present embodiment may be implemented with software. The software may be distributed by, for example, downloading the software. The software may be recorded in a recording medium such as a compact disk read-only memory (CD-ROM) for distribution. The same applies to another embodiment herein.

Second Embodiment

Outline of Second Embodiment

In the first embodiment, the information processing device 1 determines the mobile terminal 2 capable of transmitting the video corresponding to the inquiry of the user. In the present embodiment, the mobile terminal determines whether or not to transmit the video with respect to the inquiry of the user.

<Outline of Information System B>

The schematic diagram of the information system B in the present embodiment is same as FIG. 1 except for the reference numerals.

Figure 16:
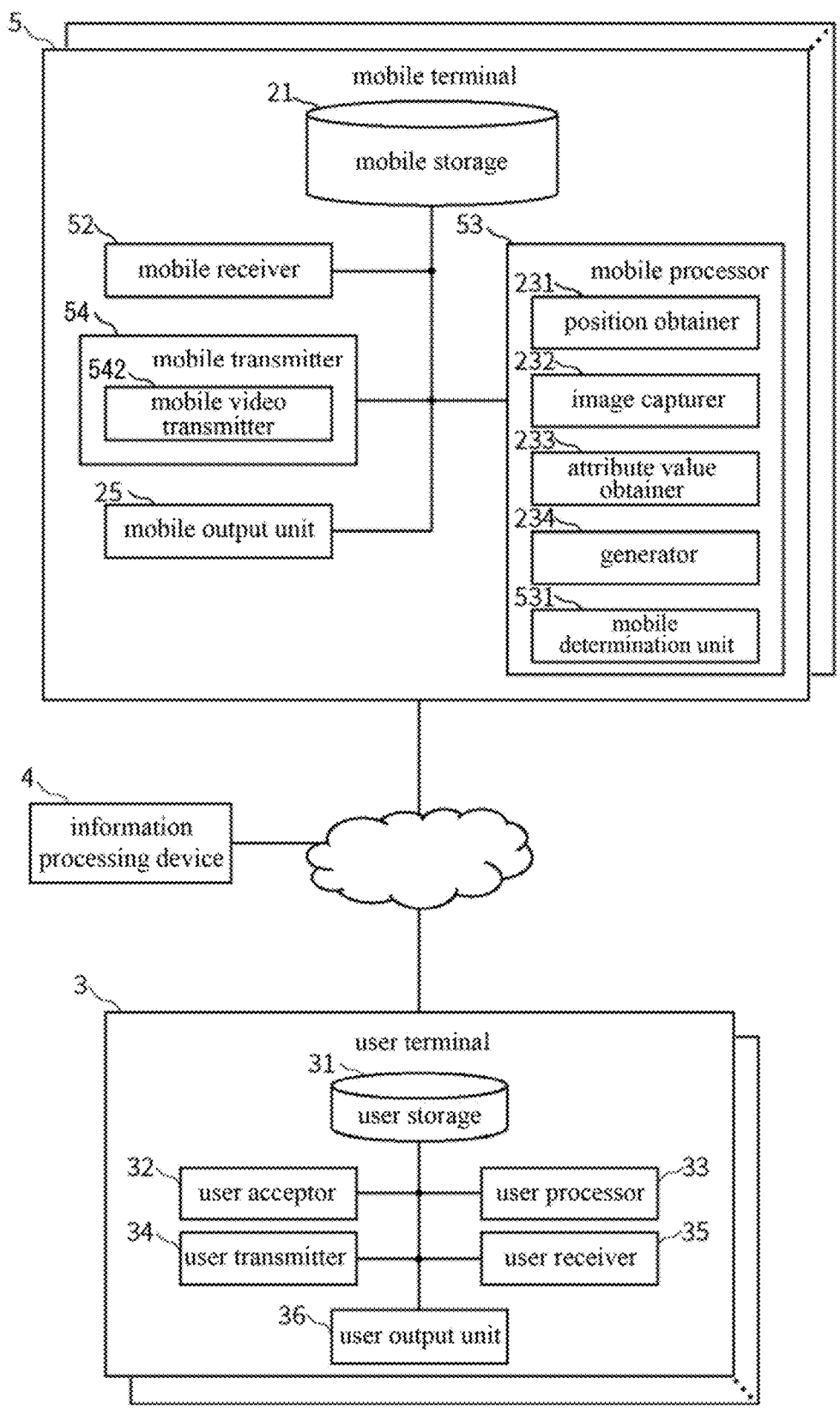
FIG. 16 is a block diagram of an information system B in the second embodiment.
Figure 17:
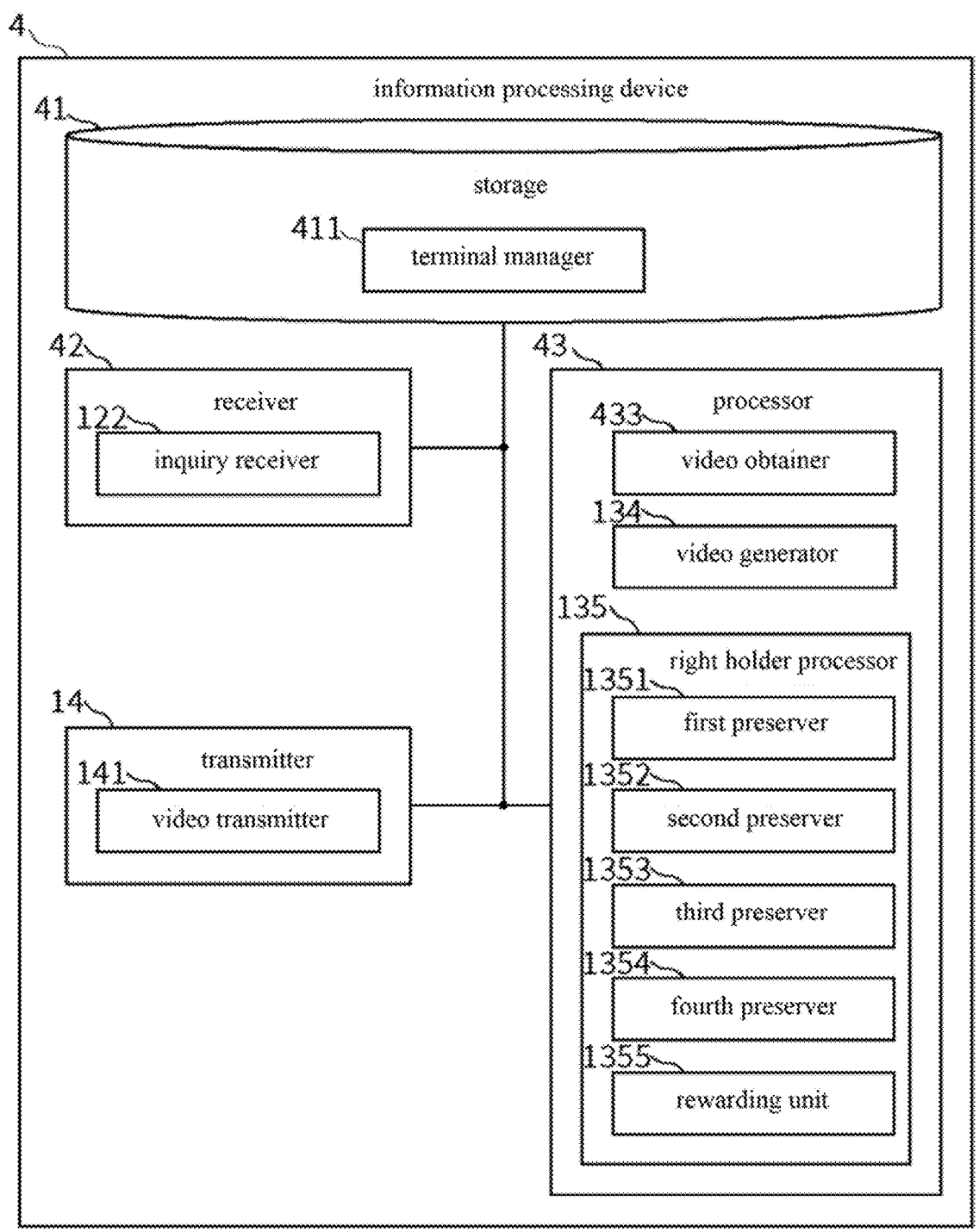
FIG. 17 is a block diagram of an information processing device 4 in the second embodiment.

FIG. 16 is a block diagram of the information system B in the present embodiment. FIG. 17 is a block diagram of the information processing device 4.

The information system B includes an information processing device 4, one or a plurality of mobile terminals 5 and one or a plurality of user terminals 3.

The information processing device 4 is a server for providing the video transmitted by each of one or a plurality of mobile terminals 5 to the user terminal 3. The information processing device 4 is, for example, a so-called server. The information processing device 4 is, for example, a cloud server or an application service provider (ASP) server. The type of the information processing device 4 is not limited. The information processing device 4 may be a device included in a blockchain.

The mobile terminal 5 is installed in a movable body to capture videos. The mobile terminal 5 is, for example, a smartphone, a tablet terminal, a camera with a communication function, a glasses with a camera or a smartwatch with a camera.

The information processing device 4 and each of one or more mobile terminals 5 can generally communicate with each other through a network such as the Internet. The information processing device 4 and each of one or more user terminals 3 can generally communicate with each other through a network such as the Internet.

The information processing device 4 includes a storage 41, a receiver 42, a processor 43 and a transmitter 44. The storage 41 includes a terminal manager 411. The receiver 42 includes an inquiry receiver 122. The processor 43 includes a video obtainer 433, a video generator 134 and a right holder processor 135. The transmitter 44 includes an inquiry transmitter 441 and a video transmitter 141.

The mobile terminal 5 includes a mobile storage 21, a mobile receiver 52, a mobile processor 53, a mobile transmitter 54 and a mobile output unit 25. The mobile processor 53 includes a position obtainer 231, an image capturer 232, an attribute value obtainer 233, a generator 234 and a mobile determination unit 531. The mobile transmitter 54 includes a mobile video transmitter 542.

<Detail of Components of Information Processing Device 4>

The storage 41 stores various kinds of information. The various kinds of information is, for example, the later described terminal information, the video and the video attribute value associated with the video.

The terminal manager 411 stores one or a plurality of terminal information. The terminal information is associated with the mobile terminal 5. The terminal information is the information related to the mobile terminal 5. The terminal information here normally includes the terminal identifier which is the identifier of the mobile terminal 5 and the terminal communication information.

The receiver 42 receives various kinds of information and instructions from the mobile terminal 5 or the user terminal 3. The various kinds of information and instructions are, for example, the inquiry, the video or the additional video.

The processor 43 performs various kinds of processes. For example, the various kinds of processes are performed by the video obtainer 433, the video generator 134 and the right holder processor 135.

The video obtainer 433 obtains the video captured by each of the mobile terminals 5 satisfying the route condition.

The video obtainer 433 normally receives the video from the mobile terminal 5 when the inquiry is transmitted. For example, the video obtainer 433 receives the video captured by each of a plurality of mobile terminals 5. The mobile terminal 5 transmitting the video is the mobile terminal 5 corresponding to the positional information satisfying the inquiry.

For example, the video obtainer 433 obtains the first video corresponding to the positional information identifying the first partial route in the route identified by the route identification information and obtains the second video corresponding to the positional information identifying the second partial route which is the route other than the first route in the route identified by the route identification information.

The transmitter 44 transmits various kinds of information and instructions to the mobile terminal 5 or the user terminal 3. The various kinds of information and instructions are, for example, the inquiry, the video or the finish instruction.

The inquiry transmitter 441 transmits the inquiry received by the inquiry receiver 122 to each of one or more mobile terminals 5. The above described mobile terminal 5 is the terminal managed by the terminal manager 411.

<Detail of Components of Mobile Terminal 5>

The mobile receiver 52 receives the inquiry including the route identification information.

The mobile processor 53 performs various kinds of processes. The various kinds of processes are, for example, the processes performed by the position obtainer 231, the image capturer 232, the attribute value obtainer 233, the generator 234 and the mobile determination unit 531.

The mobile determination unit 531 determines whether or not the positional information obtained by the position obtainer 231 satisfies the route condition which is the condition corresponding to the positional information satisfying at least a part of the route identified by the route identification information.

When the timing flag included in the inquiry is "realtime," the mobile determination unit 531 determines whether or not the latest positional information obtained by the position obtainer 231 satisfies the route condition which is the information indicating the position on the route identified by the route identification information.

When the timing flag included in the inquiry is "past," the mobile determination unit 531 determines whether or not at least a part of the route identified by one or more positional information stored in the mobile storage 21 satisfies the route condition which is the condition that a part of the route identified by the route identification information.

The mobile transmitter 54 transmits various kinds of information to the information processing device 4. The various kinds of information are, for example, the attribute value set, the video or the additional video.

When the mobile video transmitter 542 determines that the mobile determination unit 531 corresponds to the inquiry, the video is transmitted. Note that the video here may be the additional video. The operation of corresponding to the inquiry is the operation of satisfying the route condition.

When the timing flag included in the inquiry is "realtime," the mobile video transmitter 542 transmits the currently capturing video to the information processing device 4.

When the timing flag included in the inquiry is "past," the mobile video transmitter 542 transmits the video paired with one or a plurality of positional information for identifying a part or an entire of the route identified by the received route identification information to the information processing device 4. Note that the above described video is the video stored in the mobile storage 21.

The storage 41 and the terminal manager 411 are preferably a nonvolatile recording medium. However, these storages may be a volatile recording medium.

The process of storing the information in the storage 41 or the like is not limited. For example, the information may be stored in the storage 41 or the like via a recording medium, the information transmitted via a communication line or the like may be stored in the storage 41 or the like, or the information inputted by an input device may be stored in the storage 41 or the like.

The receiver 42 and the mobile receiver 52 are normally implemented by a wireless or wired communication means. However, these receivers may be implemented by a means for receiving a broadcast.

The processor 43, the mobile processor 53 and the mobile determination unit 531 may normally be implemented by a processor, a memory or the like. The processing procedure of the processor 43 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

The video obtainer 433 is normally implemented by a wireless or wired communication means. However, the video obtainer 433 may be implemented by a means for receiving a broadcast.

The transmitter 44, the inquiry transmitter 441, the mobile transmitter 54 and the mobile video transmitter 542 are normally implemented by a wireless or wired communication means. However, these transmitters may be implemented by a broadcast means.

<Operation>

Figure 18:
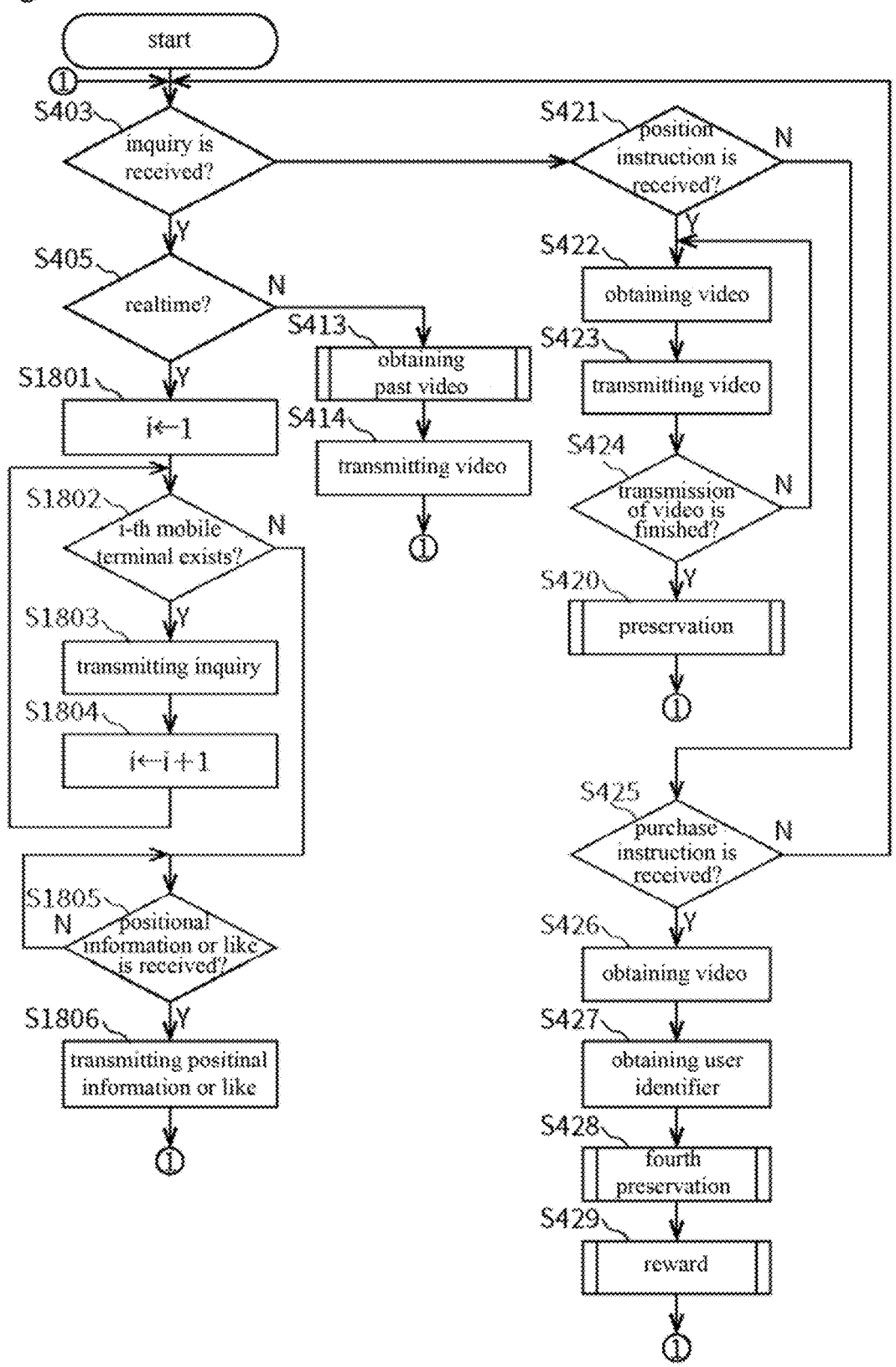
FIG. 18 is a flowchart for explaining an operation example of the information processing device 4 in the second embodiment.

Then, the operation example of the information system B will be explained. First, the operation example of the information processing device 4 will be explained using the flowchart in FIG. 18. In the flowchart of FIG. 18, the explanation of the steps same as the flowchart of FIG. 4 is omitted.

(S1801) The processor 43 substitutes 1 for a counter i.

(S1802) The processor 43 determines whether or not the i-th mobile terminal 5 exists in the mobile terminals 5 managed by the terminal manager 411. When the i-th mobile terminal 5 exists, the processing proceeds to S1803. When the i-th mobile terminal 5 does not exist, When the processing proceeds to S1805.

(S1803) The processor 43 obtains the terminal communication information of the i-th mobile terminal 5 from the terminal manager 411. The inquiry transmitter 441 transmits the received inquiry to the i-th mobile terminal 5 corresponding to the obtained terminal communication information.

(S1804) The processor 43 increments the counter i by 1. The processing returns to S1802.

(S1805) The receiver 42 determines whether or not the positional information or the like is received from one or a plurality of mobile terminals 5. When the positional information or the like is received, the processing proceeds to S1806. When the positional information or the like is not received, the processing returns to S1805.

Note that the receiver 42 here waits, for example, until a predetermined period has passed after the inquiry is transmitted. The positional information or the like is, for example, the positional information, the thumbnail image, the positional information and the video. The positional information or the like may include one or more video attribute values. The receiver 42 here may not receive the positional information or the like.

(S1806) The transmitter 44 transmits the positional information or the like of each of one or more mobile terminals 5 received in S1805 to the user terminal 3 transmitting the inquiry. The processing returns to S403.

In the flowchart in FIG. 18, the process ends when the power is turned off or the instruction of ending process is interrupted.

Figure 19:
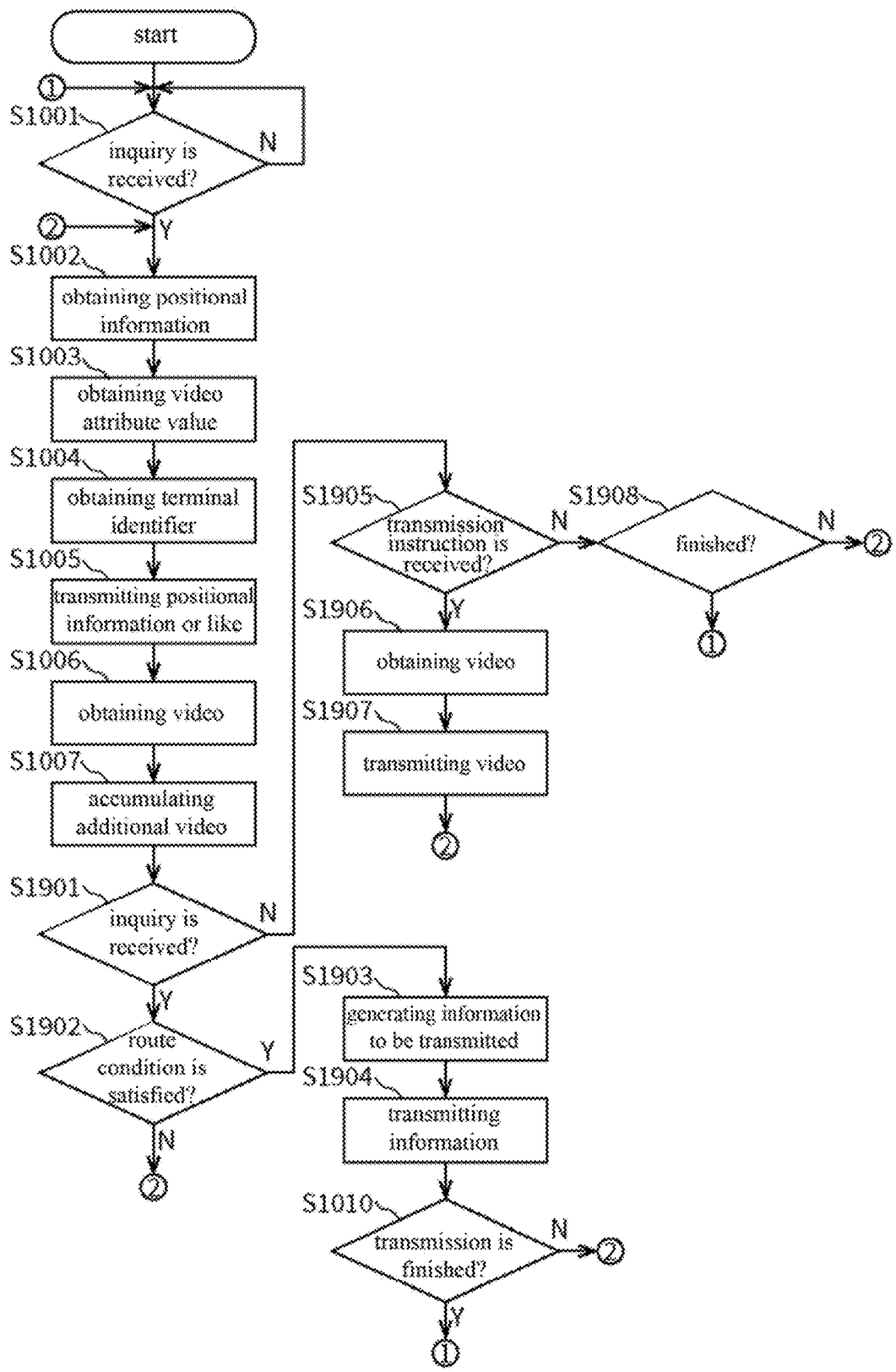
FIG. 19 is a flowchart for explaining an operation example of the mobile terminal 5 in the second embodiment.

Then, the operation example of the mobile terminal 5 will be explained using the flowchart in FIG. 19. In the flowchart of FIG. 19, the explanation of the steps same as the flowchart of FIG. 10 is omitted.

(S1901) The mobile receiver 52 determines whether or not the inquiry is received from the information processing device 4. When the inquiry is received, the processing proceeds to S1902. When the inquiry is not received, the processing proceeds to S1905.

(S1902) The mobile determination unit 531 obtains the route identification information included in the inquiry. The mobile determination unit 531 obtains the latest positional information. The mobile determination unit 531 determines whether or not the latest positional information satisfies the route condition with respect to the route identified by the route identification information. When the route condition is satisfied, the processing proceeds to S1903. When the route condition is not satisfied, the processing proceeds to S1002.

Note that the route condition here is the condition that the latest positional information is the information indicating one position on the route identified by the route identification information.

(S1903) The mobile processor 53 generates the information to be transmitted. Note that the information to be transmitted is, for example, the latest positional information, one or more video attribute values, the thumbnail image and the terminal identifier. The information to be transmitted is, for example, the latest positional information, one or more video attribute values, the video and the terminal identifier.

(S1904) The mobile transmitter 54 transmits the information generated in S1903 to the information processing device 4. The processing proceeds to S1010.

(S1905) The mobile receiver 52 determines whether or not the transmission instruction is received from the information processing device 4. When the transmission instruction is received, the processing proceeds to S1906. When the transmission instruction is not received, the processing proceeds to S1908.

(S1906) The mobile processor 53 obtains the video. Note that the mobile processor 53 normally obtains the video stored in the mobile storage 21. The mobile processor 53 here preferably obtains the video corresponding to the positional information for identifying the route overlapping with the route indicated by the route identification information included in the transmission instruction in the videos stored in the mobile storage 21.

(S1907) The mobile video transmitter 542 transmits the video obtained in S1906 to the information processing device 4.

(S1908) The mobile processor 53 determines whether or not to finish the process. When the process will be finished, the processing returns to S1901. When the process will not be finished, the processing returns to Step S1902. Note that the case when the process will be finished is, for example, when the end instruction of the process of accumulating the video is received.

In the flowchart in FIG. 19, the process ends when the power is turned off or the instruction of ending process is interrupted.

As described above, in the present embodiment, the information processing device 4 is a platform for appropriately providing the video of each position on the route.

In the present embodiment, the information processing device 4 can be a platform for appropriately providing the video of a plurality of positions on the route.

In the present embodiment, a platform for providing the video of each position on the route with less burden can be provided.

In the present embodiment, the burden of the platform for appropriately providing the video of each position on the route can be reduced.

In the present embodiment, an appropriate process related to the right holder of the video can be performed.

In the present embodiment, the reward can be provided to the right holder of the video captured by the mobile terminal.

In the present embodiment, an appropriate reward can be provided to the right holder of the video captured by the mobile terminal.

In the present embodiment, the video can be preserved.

In the present embodiment, an appropriate right holder can be set to the right holder of the video.

Figure 20:
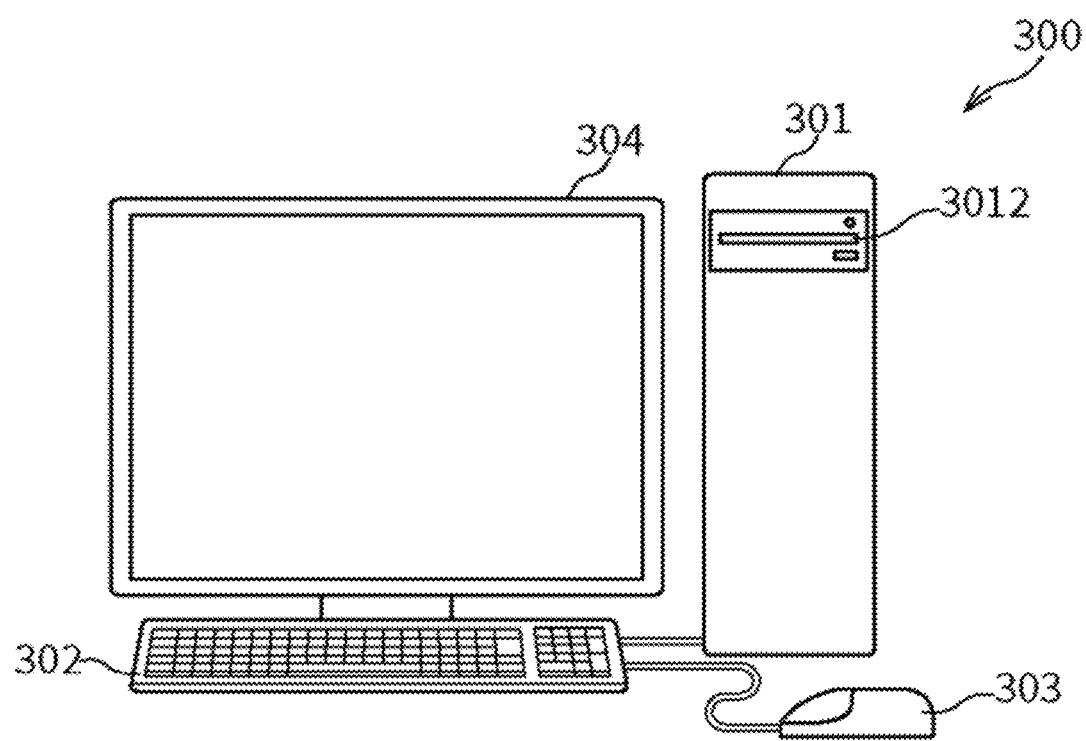
FIG. 20 is a schematic external view of a computer system in the above described embodiments.

FIG. 20 shows the external appearance of a computer that executes the program described in this specification and achieves the devices such as the information processing device 1 according to the various kinds of embodiments described above. The above described embodiments can be implemented with computer hardware and a computer program executed on the computer hardware. FIG. 20 is a schematic diagram of a computer system 300 and FIG. 21 is a block diagram of the system 300.

In FIG. 20, the computer system 300 includes a computer 301 including a CD-ROM drive, a keyboard 302, a mouse 303 and a monitor 304.

Figure 21:
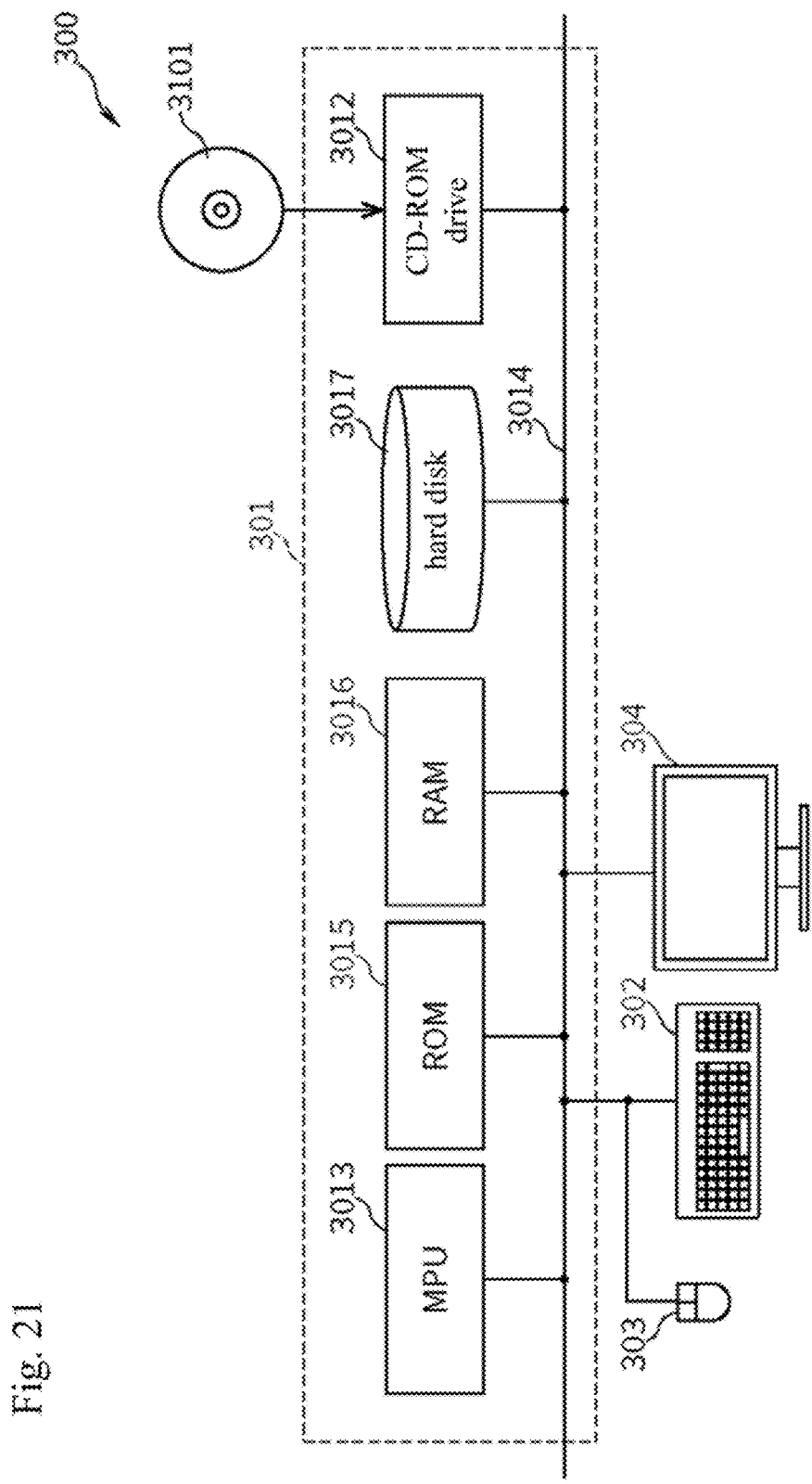
FIG. 21 is a block diagram of the computer system in the above described embodiments.

In FIG. 21, the computer 301 includes a CD-ROM drive 3012, a microprocessor unit (MPU) 3013, a bus 3014 connected to the CD-ROM drive 3012 or the like, a read-only memory (ROM) 3015 storing programs such as a boot-up program, a random access memory (RAM) 3016 connected to the MPU 3013, temporary storing a command from an application program, and providing a temporarily storing space, and a hard disk 3017 storing an application program, a system program and data. Although not shown in the figure, the computer 301 may further include a network card that allows connection to a local area network (LAN).

A program that causes the computer system 300 to function as, for example, the information processing device 1 according to the above described embodiment may be stored in a CD-ROM 3101, inserted into the CD-ROM drive 3012 and transferred to the hard disk 3017. Alternatively, the program may be transmitted to the computer 301 through a not-illustrated network and stored in the hard disk 3017. The program is loaded on the RAM 3016 when the program is executed. The program may be directly loaded from the CD-ROM 3101 or the network.

It is not necessary for the programs to include, for example, a third party program or an operation system (OS) that causes the computer 301 to function as, for example, the information processing device 1 according to the above described embodiment. The programs may be any program that includes a command to call an appropriate function (module) in a controlled manner and obtain an intended result. The manner in which the computer system 300 operates is conventionally known. Thus, the detailed explanation is omitted.

The steps in the above described program, such as transmitting or receiving information, do not include processing performed by hardware, or for example, processing performed by a modem or an interface card in the transmission step (processing performed by hardware alone).

One or more computers may execute the above described program. Namely, either integrated processing or distributed processing may be performed.

In each of the above described embodiments, a plurality of communicators included in a single device may be implemented by a single physical medium.

In each of the embodiments, each process may be performed by a single device through integrated processing or by multiple devices through distributed processing.

The present invention is not limited to the above embodiments, but may be modified variously within the scope of the present invention.

INDUSTRIAL APPLICABILITY

As described above, the information processing device 1 of the present invention has the effect capable of appropriately obtaining the video of each position on the route and is effective as a server or the like for transmitting the video.

The invention claimed is:

1. An information processing device comprising:
   a position receiver configured to receive a terminal positional information for identifying a position of each of one or more mobile terminals from each of the one or more mobile terminals;
   a terminal manager configured to continuously accumulate the terminal information received by the position receiver including the terminal positional information for identifying a latest position of each of one or more mobile terminals at each point of time while being associated with each of the one or more mobile terminals;
   an inquiry receiver configured to receive an inquiry including a route identification information for identifying a route from a user terminal;
   a terminal determination unit configured to determine the one or more mobile terminals having the latest position located in at least a part of the route identified by the route identification information by referring to the terminal positional information accumulated in the terminal manager,
   an obtainer configured to obtain a first image corresponding to a first positional information for identifying a first partial route in an image corresponding a positional information for identifying at least a part of the route identified by the route identification information from each of the one or more mobile terminals and obtain a second image corresponding to a second positional information for identifying a second partial route which is beyond the first partial route in the route identified by the route identification information from each of the one or more mobile terminals, the first image and the second image being captured by each of the one or more mobile terminals; and
   a transmitter configured to transmit the first image and the second image to the user terminal, wherein
   the obtainer is configured to obtain the first image and the second image, which are a latest image captured in real time by each of the one or more mobile terminals determined by the terminal determination unit.

2. The information processing device according to claim 1, wherein
   the image obtained by the obtainer is associated with a right holder identifier for identifying a right holder of the image, and
   a right holder processor is further provided to perform a right holder process which is a process related to the right holder identified by the right holder identifier associated with the image.

3. The information processing device according to claim 2, wherein
   the right holder processor includes a third preserver configured to accumulate the image while being associated with the right holder identifier for identifying a user of the user terminal.

4. A mobile terminal comprising:
   a position obtainer configured to continuously obtain a terminal positional information for identifying a latest position of a mobile terminal;
   an image capturer configured to capture an image;
   a mobile receiver configured to receive an inquiry including a route identification information;
   a mobile determination unit configured to determine whether or not the latest position included in the terminal positional information obtained by the position obtainer satisfies a route condition which is a condition corresponding to a positional information identifying at least a part of the route identified by the route identification information from the terminal positional information paired with a latest time of each of the one or more mobile terminals in the terminal management table; and
   a mobile transmitter configured to transmit a latest image in real time when the mobile determination unit determines that the route condition is satisfied.

5. An information processing method implemented by a position receiver, an inquiry receiver, a terminal manager configured to continuously accumulate a terminal information received by the position receiver including a terminal positional information for identifying a latest position of each of one or more mobile terminals at each point of time from each of the one or more mobile terminals, a terminal determination unit, an obtainer and a transmitter, the method comprising:
   an inquiry receiving step of receiving, by the inquiry receiver, an inquiry including a route identification information for identifying a route from a user terminal;
   a position receiving step of receiving, by the position receiver, the terminal positional information from each of the one or more mobile terminals;
   a terminal determination process of determining, by the terminal determination unit, the one or more mobile terminals having the latest position located in at least a part of the route identified by the route identification information by referring to the terminal positional information accumulated in the terminal manager;
   an obtaining step of obtaining, by the obtainer, a first image corresponding to a first positional information for identifying a first partial route in the route identified by the route identification information from each of the one or more mobile terminals and obtain a second image corresponding to a second positional information for identifying a second partial route which is beyond the first partial route in the route identified by the route identification information from each of the one or more mobile terminals, the first image and the second image being captured by the one or more mobile terminals determined by the terminal determination unit; and
   a transmitting step of transmitting, by the transmitter, the first image and the second image, which are a latest image captured in real time, to the user terminal.

6. An information processing method implemented by a position obtainer, an image capturer, a mobile receiver, a mobile determination unit and a transmitter, the method comprising:
   a position obtaining step of continuously obtaining, by the position obtainer, a positional information for identifying a latest position of a mobile terminal;
   an image capturing step of capturing, by the image capturer, an image;

a movement receiving step of receiving, by the mobile receiver, an inquiry including a route identification information;

a movement determination step of determining, by the mobile determination unit, whether or not the latest position included in the positional information obtained in the position obtaining step satisfies a route condition which is a condition corresponding to the positional information identifying at least a part of the route identified by the route identification information from the terminal positional information paired with a latest time of each of the one or more mobile terminals in the terminal management table; and a transmitting step of transmitting, by the transmitter, a latest image in real time when the mobile determination unit determines that the route condition is satisfied in the movement determination step.

* * * * *